United States Patent
Liu et al.

(10) Patent No.: US 12,518,113 B2
(45) Date of Patent: Jan. 6, 2026

(54) AR TRANSLATION PROCESSING METHOD AND ELECTRONIC DEVICE

(71) Applicant: HONOR DEVICE CO., LTD., Shenzhen (CN)

(72) Inventors: Xiaowei Liu, Shenzhen (CN); Bing Chen, Shenzhen (CN); Guoyi Wang, Shenzhen (CN); Junwei Zhou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 325 days.

(21) Appl. No.: 18/278,080

(22) PCT Filed: Aug. 25, 2022

(86) PCT No.: PCT/CN2022/114794
§ 371 (c)(1),
(2) Date: Aug. 21, 2023

(87) PCT Pub. No.: WO2023/035963
PCT Pub. Date: Mar. 16, 2023

(65) Prior Publication Data
US 2024/0135115 A1    Apr. 25, 2024

(30) Foreign Application Priority Data

Sep. 8, 2021 (CN) .......................... 202111051366.8

(51) Int. Cl.
*G06F 40/58* (2020.01)
*G06T 7/33* (2017.01)

(52) U.S. Cl.
CPC ............... *G06F 40/58* (2020.01); *G06T 7/33* (2017.01)

(58) Field of Classification Search
CPC .......... G06F 40/58; G06F 40/44; G06F 40/45; G06F 40/47
See application file for complete search history.

(56) References Cited

U.S. PATENT DOCUMENTS 8,761,513 B1 * 6/2014 Rogowski .............. G06V 20/20
382/187
9,773,197 B2 * 9/2017 Englund ................ G06V 20/62
(Continued)

FOREIGN PATENT DOCUMENTS

| CN | 105706077 A | 6/2016 |
| CN | 107273106 A | 10/2017 |

(Continued)

OTHER PUBLICATIONS

Jiang et al: "The Research and Implementation of Real-time Translation System Based on Mobile Cloud", Southeast University, Sep. 16, 2015, total 64 pages.
(Continued)

*Primary Examiner* — Lamont M Spooner
(74) *Attorney, Agent, or Firm* — WOMBLE BOND DICKINSON (US) LLP

(57) ABSTRACT

Provided are an AR translation processing method and an electronic device, which relate to the technical field of communications. By the method, in a scenario in which an electronic device is used for AR translation, a pose change of the electronic device can be detected in real time, and feature matching can be performed on a plurality of consecutive frames of images acquired by a camera, so that whether to-be-translated text needs to be fully translated or partially translated, or needs not to be translated can be determined based on the pose change of the electronic device and a feature matching result, and therefore a corresponding translation trigger strategy is selected. In this way, repeated translation can be effectively avoided, thereby (Continued)

saving computing resources in the AR translation process and improving the translation efficiency to a particular extent.

20 Claims, 12 Drawing Sheets

(56) References Cited

U.S. PATENT DOCUMENTS

| | | | |
|---|---|---|---|
| 9,785,632 B1* | 10/2017 | Beaven | G06T 3/02 |
| 9,858,754 B2 | 1/2018 | Lyons et al. | |
| 10,726,212 B2* | 7/2020 | Cuthbert | G06V 20/20 |
| 10,990,768 B2 | 4/2021 | Tu et al. | |
| 11,222,442 B2 | 1/2022 | Bao et al. | |
| 11,321,870 B2 | 5/2022 | Lin et al. | |
| 2010/0030549 A1* | 2/2010 | Lee | G06F 3/0482 |
| | | | 704/4 |
| 2011/0090253 A1 | 4/2011 | Good | |
| 2012/0330646 A1 | 12/2012 | Robbins et al. | |
| 2013/0253900 A1* | 9/2013 | Escobedo | G10L 13/00 |
| | | | 704/2 |
| 2014/0081620 A1* | 3/2014 | Solntseva | G06F 3/04883 |
| | | | 704/3 |
| 2014/0129207 A1 | 5/2014 | Bailey et al. | |
| 2014/0192210 A1 | 7/2014 | Gervautz et al. | |
| 2014/0297256 A1* | 10/2014 | Rogowski | G06V 10/993 |
| | | | 704/2 |
| 2016/0203124 A1* | 7/2016 | Cuthbert | G06F 40/51 |
| | | | 704/2 |
| 2016/0321246 A1* | 11/2016 | Satoh | G06F 40/58 |
| 2016/0350895 A1* | 12/2016 | Yamaguchi | G06T 3/60 |
| 2017/0060850 A1 | 3/2017 | Lewis et al. | |
| 2018/0075508 A1 | 3/2018 | Hewavitharana et al. | |
| 2020/0013206 A1* | 1/2020 | Seely | G06F 40/154 |
| 2020/0167556 A1* | 5/2020 | Kaur | G06F 3/0304 |
| 2021/0165973 A1* | 6/2021 | Kofman | G06F 40/30 |
| 2022/0026920 A1* | 1/2022 | Ebrahimi Afrouzi | G06N 7/01 |
| 2022/0197033 A1 | 6/2022 | Liang et al. | |
| 2022/0337741 A1* | 10/2022 | Paul | G06F 3/04886 |
| 2023/0229279 A1* | 7/2023 | Paul | G06F 3/04847 |
| | | | 715/767 |

FOREIGN PATENT DOCUMENTS

| | | |
|---|---|---|
| CN | 107273895 A | 10/2017 |
| CN | 107391500 A | 11/2017 |
| CN | 107924395 A | 4/2018 |
| CN | 107992867 A | 5/2018 |
| CN | 108415905 A | 8/2018 |
| CN | 108681393 A | 10/2018 |
| CN | 108734736 A | 11/2018 |
| CN | 108985201 A | 12/2018 |
| CN | 109003398 A | 12/2018 |
| CN | 109325978 A | 2/2019 |
| CN | 109460556 A | 3/2019 |
| CN | 109558604 A | 4/2019 |
| CN | 109598003 A | 4/2019 |
| CN | 110139028 A | 8/2019 |
| CN | 110188364 A | 8/2019 |
| CN | 110210040 A | 9/2019 |
| CN | 110245356 A | 9/2019 |
| CN | 110276349 A | 9/2019 |
| CN | 110472482 A | 11/2019 |
| CN | 110544280 A | 12/2019 |
| CN | 111160333 A | 5/2020 |
| CN | 111199159 A | 5/2020 |
| CN | 111414768 A | 7/2020 |
| CN | 111428522 A | 7/2020 |
| CN | 111597828 A | 8/2020 |
| CN | 112052648 A | 12/2020 |
| CN | 112135054 A | 12/2020 |
| CN | 112329485 A | 2/2021 |
| CN | 112668307 A | 4/2021 |
| CN | 113093387 A | 7/2021 |
| CN | 113255377 A | 8/2021 |

OTHER PUBLICATIONS

L. Tatwany and H. C. Ouertani, "A review on using augmented reality in text translation," 2017 6th International Conference on Information and Communication Technology and Accessibility (ICTA), Muscat, Oman, 2017, pp. 1-6, doi: 10.1109/ICTA.2017.8336044.

* cited by examiner (a)

(b)

AR TRANSLATION PROCESSING METHOD AND ELECTRONIC DEVICE

CROSS-REFERENCE TO RELATED APPLICATIONS

This application is a national stage of International Application No. PCT/CN2022/114794, filed on Aug. 25, 2022, which claims priority to Chinese Patent Application Ser. No. 20/211,1051366.8, filed on Sep. 8, 2021. The disclosures of both of the aforementioned applications are hereby incorporated by reference in their entireties.

TECHNICAL FIELD

This application relates to the field of augmented reality (augmented reality, AR) technologies, and in particular, to an AR translation processing method and an electronic device.

BACKGROUND

At present, AR technologies are increasingly applied to online shopping, education, medical, games, navigation, translation, and other fields. The AR technologies are technologies for displaying virtual digital content (for example, a three-dimensional model) and a real physical world in a superimposed manner.

For example, in translation using AR technologies (AR translation for short), a mobile phone may acquire an image of a to-be-translated target by using a camera, then translate text content in the image, and superimpose virtual digital content obtained by translation with a preview image acquired by the camera of the mobile phone, so as to present a 3D translation effect on a display screen.

At present, AR translation is typically implemented by translating and displaying acquired images frame by frame in real time, in other words, an entire translation process needs to be done for each frame of image acquired by an AR device, which requires a large amount of computing resources, resulting in a low translation efficiency. Therefore, there is an apparent phenomenon of jam during displaying of a translation result, which affects the user experience.

SUMMARY

This application provides an AR translation processing method and an electronic device, which solve the problems that a large amount of computing resources need to be used during AR translation and a jam appears during displaying of a translation result.

To achieve the foregoing objective, the following technical solutions are used in this application:

According to a first aspect, this application provides an AR translation processing method, including:

acquiring, by a camera of an electronic device, a first image, where the first image includes first to-be-translated text;

translating the first to-be-translated text, to obtain a first translation result;

displaying the first image and displaying a first virtual image on the first image in a superimposed manner, where the first virtual image includes the first translation result;

acquiring, by the camera, a second image, where the second image includes second to-be-translated text;

in a case that a pose change amount of the electronic device is less than a preset pose threshold and a feature similarity between the second image and the first image is greater than or equal to a preset similarity threshold, obtaining the first translation result as a translation result of the second to-be-translated text; or in a case that a pose change amount of the electronic device is less than a preset pose threshold and a feature similarity is less than a preset similarity threshold, translating the second to-be-translated text; or in a case that a pose change amount of the electronic device is greater than or equal to a preset pose threshold and a feature similarity is less than a preset similarity threshold, translating part or all of text in the second to-be-translated text; and displaying the second image and displaying a second virtual image on the second image in a superimposed manner, where the second virtual image includes the translation result of the second to-be-translated text.

By the AR translation processing method provided in this embodiment of this application, in a scenario in which an electronic device is used for AR translation, a pose change of the electronic device can be detected in real time, and feature matching can be performed on a plurality of consecutive frames of images acquired by a camera, so that whether to-be-translated text needs to be fully translated or partially translated or needs not to be translated can be determined based on the pose change of the electronic device and a feature matching result, and therefore a corresponding translation trigger strategy is selected. In this way, repeated translation can be effectively avoided, thereby saving computing resources in the AR translation process and improving the translation efficiency to a particular extent.

Exemplarily, in a scenario in which a mobile phone does not move and read content remains unchanged, it may be determined that the pose change is small and the to-be-translated text does not change; therefore, translation does not need to be translated again, and a previous translation result can be directly obtained, thereby greatly saving computing resources.

Still exemplarily, in a scenario in which a mobile phone does not move and pages are turned for reading, it may be determined that the pose change is small, but the to-be-translated text changes greatly; therefore, all of text in a current frame of image needs to be translated.

Still exemplarily, in a scenario in which a mobile phone moves (for example, moves evenly, rotates, stretches far or near, or shakes) by a relatively large amplitude, it may be determined that the pose change is great, and to-be-translated content changes; therefore, all or part of the text in a current frame of image needs to be translated.

In a scenario in which a pose change amount of the electronic device is greater than or equal to a preset pose threshold and a feature similarity is less than a preset similarity threshold, the following two cases may exist, and correspondingly there are two implementations:

Case 1: In a possible implementation, the translating part or all of text in the second to-be-translated text includes:

in a case that a first part of text in the second to-be-translated text is the same as the first to-be-translated text, obtaining the first translation result as a translation result of the first part of text; and translating a second part of text, to obtain a translation result of the second part of text, where the second part of text is text other than the first part of text in the second to-be-translated text; and the translation result of the second to-be-translated text includes the translation result of the first part of text and the translation result of the second part of text.

In the foregoing case 1, in a case that there is part of text content overlapped or duplicated between the current frame of image and a previous frame of image, text in the overlapped or duplicated part does not need to be translated.

Case 2: In another possible implementation, the translating part or all of text in the second to-be-translated text includes:

in a case that the second to-be-translated text and the first to-be-translated text do not have same text, translating all of text in the second to-be-translated text, to obtain the translation result of the second to-be-translated text.

In the foregoing case 2, in a case that there is no text content overlapped or duplicated between the current frame of image and the previous frame of image, all of text in the current frame of image needs to be translated.

In some embodiments, the electronic device may invoke a local translation engine to translate the to-be-translated text, to obtain a translation result. The translation engine may be a translation application installed in the electronic device for text translation.

In some embodiments, in a case in which the electronic device is networked, the electronic device may send the to-be-translated text to a server for text translation, and the server translates the to-be-translated text and sends a translation result to the electronic device, so that the electronic device obtains the translation result.

In another possible implementation, the foregoing method further includes:

extracting feature points in the first image and feature points in the second image; and comparing the feature points in the second image with the feature points in the first image, to obtain the feature similarity between the second image and the first image.

By the foregoing solution, feature extraction and matching may be performed on the plurality of consecutive frames of images acquired, so as to determine a quantity of feature matches or a feature similarity between the plurality of consecutive frames of images, so as to determine, based on the feature similarity, whether text in a current image needs to be fully translated or partially translated, or needs not to be translated below.

In another possible implementation, the foregoing method further includes:

generating an SLAM map by using a simultaneous localization and mapping SLAM method; and based on the second image, measurement data of a target sensor in the electronic device, and the SLAM map, determining a pose change amount of the electronic device, where the target sensor includes an inertial measurement unit IMU. Certainly, the target sensor may further include any other sensor that meets an actual use requirement, such as a gyroscope sensor or an acceleration sensor, which is not limited in this application.

In another possible implementation, the pose change amount includes a position change amount and a posture change amount.

By tracking the position and the posture of the electronic device in real time by the SLAM method, the pose change amount of the electronic device can be accurately calculated.

In another possible implementation, the foregoing method further includes:

determining, by using an SLAM method, a target virtual plane for displaying AR digital content, where the target virtual plane is located above a plane where the acquired image is located; and the displaying a second virtual image on the second image in a superimposed manner includes:

displaying the second virtual image on the target virtual plane.

From the foregoing solution, it can be learned that the AR scenario may include a plane where the acquired image (including the to-be-translated text) is located and a plane where the virtual image (including the translation result) is located, and the two images are displayed in a superimposed manner, to achieve a three-dimensional display effect.

In another possible implementation, the foregoing method further includes:

determining a target projection region of the second to-be-translated text on the target virtual plane, where the displaying the second virtual image on the target virtual plane includes:

displaying the second virtual image in the target projection region.

From the foregoing solution, it can be learned that, by real-time tracking and performing position mapping on the to-be-translated text on the virtual plane, a position for displaying the translation result can be accurately located, and in this way, the to-be-translated text is ensured to positionally correspond to the translation result in real time; therefore, the AR display effect can be improved, which is convenient for a user to read.

In a possible implementation, the determining a target projection region of the second to-be-translated text on the target virtual plane includes:

determining a first rectangular region occupied by the second to-be-translated text in the second image;

based on two endpoints on a diagonal of the first rectangular region, determining two anchor points of the two endpoints mapped on the target virtual plane; and determining a second rectangular region on the target virtual plane with a connecting line of the two anchor points as a diagonal, where the second rectangular region is a target projection region of the second to-be-translated text on the target virtual plane.

From the foregoing solution, it can be learned that, by mapping the rectangular region where the to-be-translated text is located onto the virtual plane, the rectangular display region on the virtual plane for displaying the translation result can be determined, and in this way, the to-be-translated text is ensured to positionally correspond to the translation result in real time; therefore, the AR display effect can be improved, which is convenient for a user to read.

In another possible implementation, the foregoing method further includes: setting a transparency of the target projection region to be less than or equal to a preset transparency threshold.

By the foregoing solution, the transparency of the target projection region can be reduced, so that the target projection region is opaque or translucent, and in this way, the translation result can be displayed above the corresponding to-be-translated text, and can overlap or cover the to-be-translated text, thereby preventing the to-be-translated text from causing visual interference or influence on the virtually displayed translation result; and therefore, it is convenient for a user to read, thereby improving the user experience.

In another possible implementation, the foregoing method further includes:
    performing text recognition on the first image, to obtain the first to-be-translated text;
    and performing text recognition on the second image, to obtain the second to-be-translated text.

Exemplarily, an optical character recognition (optical character recognition, OCR) technology may be used to perform text recognition.

In another possible implementation, the foregoing method further includes:
    rendering the translation result of the first to-be-translated text, to obtain the first virtual image; and
    rendering the translation result of the second to-be-translated text, to obtain the second virtual image.

By the foregoing solution, the translation result of the to-be-translated text can be rendered into virtual digital content, so as to display the virtual digital content on the virtual plane, thereby presenting an AR display effect.

According to a second aspect, this application provides an AR translation processing apparatus, including units configured to perform the method according to the first aspect. The apparatus may correspondingly perform the method described in the first aspect. For relevant description of the units in the apparatus, reference may be made to the description of the first aspect. For brevity, details are not described herein again.

The method according to the first aspect may be implemented by hardware or may be implemented by hardware executing corresponding software. The hardware or the software includes one or more modules or units corresponding to the function, for example, a processing module or unit, a display module or unit.

According to a third aspect, this application provides an electronic device, including a processor, where the processor is coupled to a memory, the memory is configured to store a computer program or instructions, and the processor is configured to execute the computer program or instructions stored in the memory, to cause the method according to the first aspect to be performed.

For example, the processor is configured to execute the computer program or instructions stored in the memory, to cause the apparatus to perform the method according to the first aspect.

According to a fourth aspect, this application provides a computer-readable storage medium, storing a computer program (which may also be referred to as instructions or code) for implementing the method according to the first aspect.

For example, the computer program, when executed by a computer, causes the computer to perform the method according to the first aspect.

According to a fifth aspect, this application provides a chip, including a processor. The processor is configured to read and execute a computer program stored in a memory, to perform the method according to the first aspect and any possible implementation of the first aspect.

Optionally, the chip further includes the memory, and the memory and the processor are connected to the memory through a circuit or a wire.

According to a sixth aspect, this application provides a chip system, including a processor. The processor is configured to read and execute a computer program stored in a memory, to perform the method according to the first aspect and any possible implementation of the first aspect.

Optionally, the chip system further includes a memory, where the memory is connected to the processor through a circuit or a wire.

According to a seventh aspect, this application provides a computer program product, including a computer program (also referred to as instructions or code), where the computer program, when executed by a computer, causes a computer to implement the method according to the first aspect.

It may be understood that, for beneficial effects of the second aspect to the seventh aspect, reference may be made to the relevant description in the first aspect, and details are not described herein again.

DESCRIPTION OF EMBODIMENTS

Figure 1:
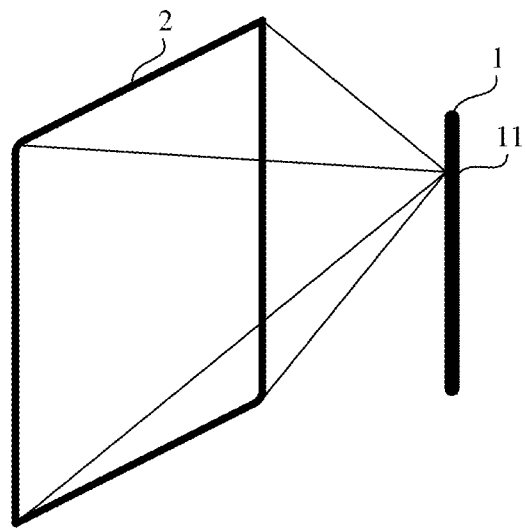
FIG. 1 is a diagram of a system architecture of an AR translation scenario according to an embodiment of this application.
Figure 1:
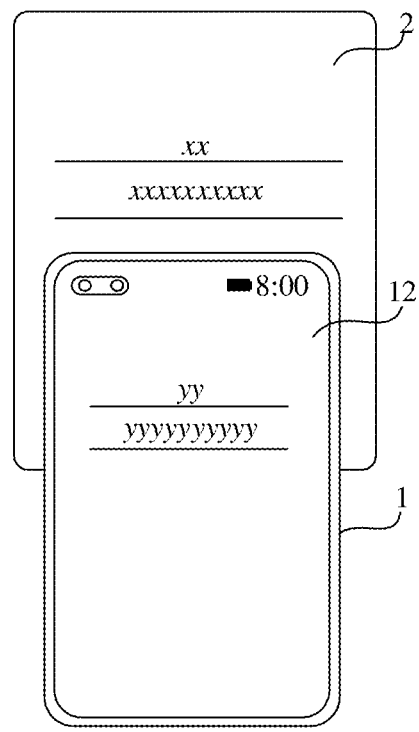

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are merely some embodiments of this application rather than all of the embodiments. All other embodiments obtained by a person of ordinary skill in the art based on the embodiments of this application without creative efforts shall fall within the protection scope of this application.

The term "and/or" used herein describes only an association relationship for describing associated objects and represents that three relationships may exist. For example, A and/or B may represent the following three cases: Only A exists, both A and B exist, and only B exists. The symbol "/" in this specification represents an "or" relationship between associated objects. For example, "A/B" means A or B.

In the specification and claims in the embodiments of this application, the terms such as "first" and "second" are intended to distinguish between different objects, but do not indicate a particular order of the objects. For example, a first image and a second image are intended to distinguish between different images, but do not indicate a particular order of the images.

In the embodiments of this application, the word "exemplary" or "for example" is used to represent giving an example, an illustration, or a description. Any embodiment or design scheme described by using "exemplarily" or "for example" in the embodiments of this application should not be explained as being more preferred or having more advantages than another embodiment or design scheme. Exactly, use of the term, such as "exemplarily" or "for example", is intended to present a related concept in a specific manner.

In the description of the embodiments of this application, unless otherwise stated, "a plurality of" means two or more. For example, "a plurality of processing units" means two or more processing units. "A plurality of elements" means two or more elements.

For ease of understanding the embodiments of this application, some terms in the embodiments of this application are described below, to facilitate understanding by a person skilled in the art.

(1) SLAM: Simultaneous positioning and mapping (simultaneous localization and mapping, SLAM), which is a visual locating and tracking method, and can be used to implement construction and tracking of a scenario based on spatial position information (for example, pose information) acquired by a camera of an electronic device. Feature points of an environment can be extracted from an image for drafting, and a position of an object (for example, a to-be-translated target or text) in the environment can be determined and tracked in real time.

(2) AR: By using an augmented reality (augmented reality, AR) technology, a computer-generated virtual object, scenario, or system prompt information can be superimposed on a real scenario, so that the virtual scenario and the real scenario are fused, so as to achieve "enhancement" of the reality.

Specific to an AR translation scenario, the real scenario (for example, a to-be-translated target) and the virtual scenario (for example, a translation result), after overlapping, can simultaneously exist in a same picture and space, and in this way, the user reading experience can be improved.

The AR algorithm can provide an SLAM tracking capability, provide a capability of plane cognition in a real environment and a capability of tracking a real position and posture of a current device camera. Exemplarily, spatial position information corresponding to a scenario can be acquired by using an AR electronic device, and then construction and tracking of the scenario can be implemented, based on the spatial position information acquired by the AR device, by using an SLAM tracking and locating method.

With the rapid development of the performance of electronic devices, visual locating and tracking, and AR technologies, an AR device may be used to acquire an image of to-be-translated text, and an intuitive three-dimensional translation effect can be presented on the image of the to-be-translated text, which has become a significant means to assist people in solving the problem in understanding of cross-language text.

However, at present, AR translation is typically implemented by translating and displaying acquired images frame by frame in real time, in other words, an entire translation process needs to be done for each frame of image acquired by an AR device, which requires a large amount of computing resources. Processes such as character extraction and translation typically need to be uploaded to a cloud end for implementing, which requires the use of cloud computing resources, and there are problems such as traffic loss, translation result display jams, and increase in power consumption due to generation of heat by the device.

On the other hand, in a case that a posture of a user holding or wearing the AR device changes (for example, moves, rotates, stretches far or near, or shakes), the translation result may drift and mismatch, and a font format and a font size may jump.

In view of this, an embodiment of this application provides an AR translation processing method, in a scenario in which an electronic device is used for AR translation, a pose change of the electronic device can be detected in real time, and feature matching can be performed on a plurality of consecutive frames of images acquired by a camera, so that whether to-be-translated text needs to be fully translated or partially translated or needs not to be translated can be determined based on the pose change of the electronic device and a feature matching result, and therefore a corresponding translation trigger strategy is selected. In this way, repeated translation can be effectively avoided, thereby saving computing resources in the AR translation process and improving the translation efficiency to a particular extent.

FIG. 1 is a schematic diagram of a system architecture involved in exemplary embodiments of this application. As shown in FIG. 1, the system architecture may include an electronic device 1 and a to-be-translated target 2.

As shown in FIG. 1(*a*), the electronic device 1 includes a camera 11. The camera 11 may be configured to acquire an image of the to-be-translated target 2. The electronic device 1 performs processes such as text recognition, extraction, and translation on the image, and then generates virtual digital content.

As shown in FIG. 1(*b*), the electronic device 1 further includes a display screen 12, for example, a touchscreen, a flexible screen, and a curved screen. The display screen 12 may be configured to display an image of the to-be-translated target 2, and display virtual digital content on the image of the to-be-translated target 2 in a superimposed manner, so as to achieve a three-dimensional display effect.

It should be noted that the electronic device in this embodiment of this application may be a handheld terminal (for example, a mobile phone), or may be AR glasses or any other electronic device that meets an actual use requirement, which is not specifically limited in this embodiment of this application.

In this embodiment of this application, during the AR translation, a relative pose change between the electronic device and the to-be-translated target may be determined based on visual locating and tracking, text is extracted from acquired image information and translated into text of a target language, and in addition, a position of the text in an image coordinate system is determined. Then, the translation result is rendered into AR digital content and is superimposed on the corresponding position of the original image. Then, the relative position of the current device and the photographed object, such as an angle and a position, is continuously tracked and located; in a case that the relative position of the current device changes and exceeds a preset threshold, the entire translation and display process needs to be performed again. Otherwise, the display content is correspondingly adjusted, based on a changed pose, by using the previously rendered augmented reality/digital content, to accurately match on content corresponding to the current image.

An execution entity of the AR translation processing method provided in this embodiment of this application may be the foregoing electronic device, or may be functional modules and/or functional entities in the electronic device that are capable of implementing the AR translation processing method. In addition, the solutions of this application can be implemented in a hardware and/or software manner. Details can be determined based on an actual use requirement, which is not limited in this embodiment of this application. The following exemplarily describes the AR translation processing method provided in this embodiment of this application by an example of an electronic device.

Figure 2:
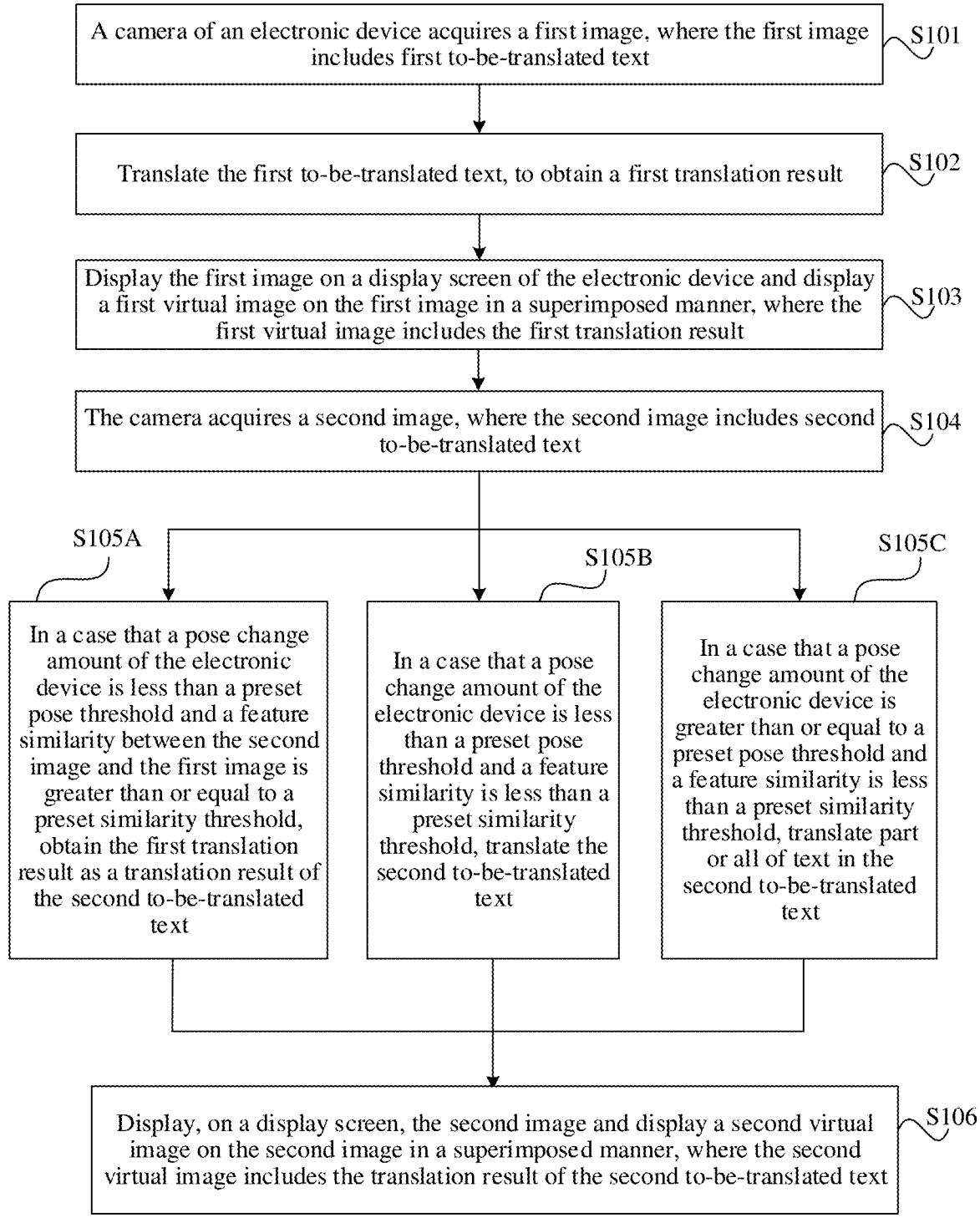
FIG. 2 is a schematic flowchart of an AR translation processing method according to an embodiment of this application.

FIG. 2 is a schematic flowchart of an AR translation processing method according to an embodiment of this application. As shown in FIG. 2, the method includes the following steps S101 to S106:

S101: A camera of an electronic device acquires a first image, where the first image includes first to-be-translated text.

Figure 3:
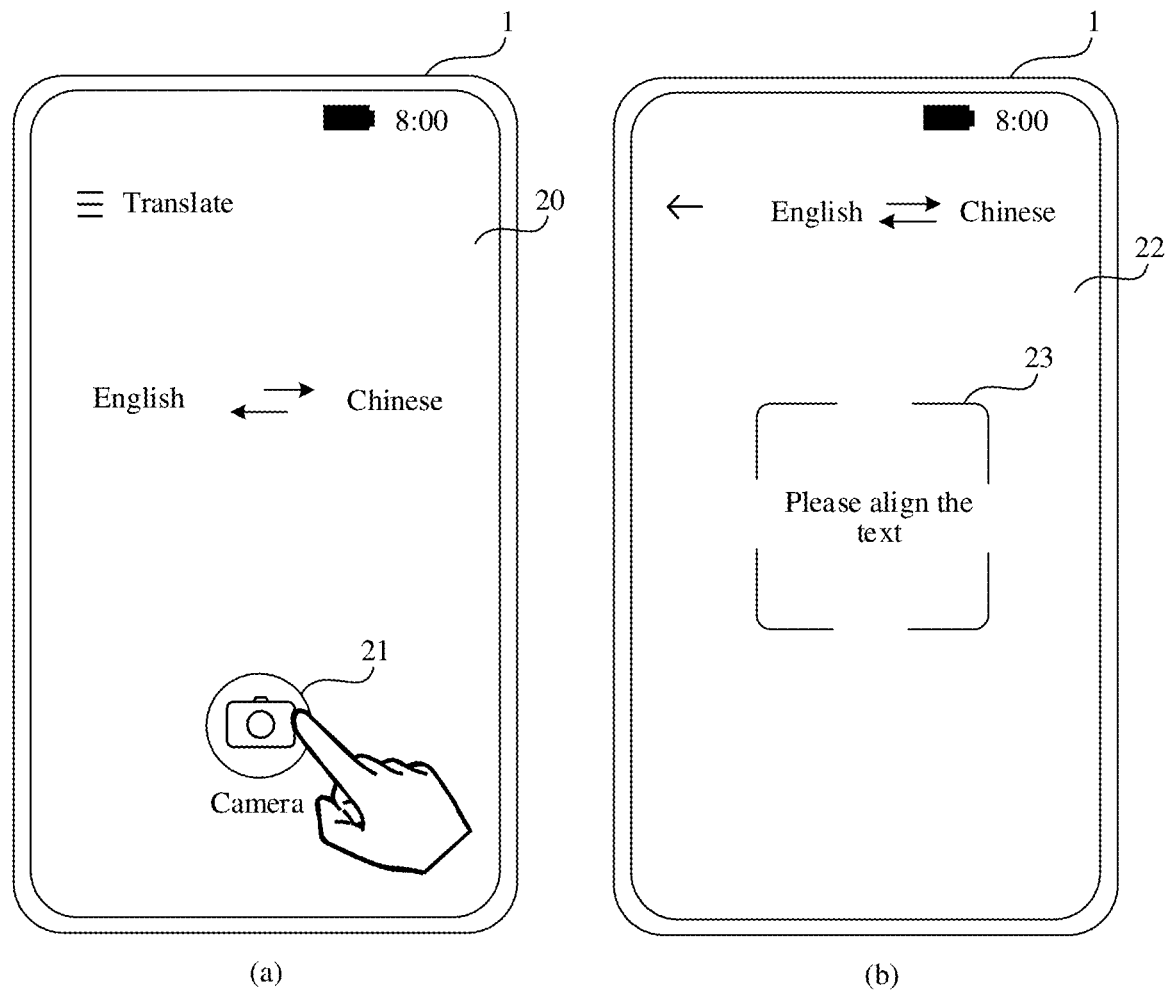
FIG. 3 is a schematic diagram of interfaces for enabling an AR translation function in an AR translation processing method according to an embodiment of this application.

In this embodiment of this application, in a case that AR translation is performed by the electronic device, the electronic device first needs to enable an AR translation function and start the camera, to acquire an image. An exemplary description is provided below with reference to FIG. 3.

As shown in FIG. 3(a), in response to a trigger operation by a user, an electronic device 1 may enable a translation application and display an interface 20 of the translation application. A source language option and a target language option are displayed in the interface 20, so that the user may select a type of a source language to be translated and a type of a target language according to an actual use requirement. For ease of description, translation between English and Chinese is used as an example for description. A control 21 is also displayed in the interface 20, and the control 21 may be used for triggering to enable an AR translation function.

The trigger operation of the user may be enabling the translation application by clicking/tapping, touching, sliding, shaking, or may be enabling the translation application by voice control or other approaches, which is not limited in this application. For example, after the electronic device detects a touch operation by the user, the translation function in the application is enabled and the camera is started.

As shown in FIG. 3(a), in response to an operation (for example, a click/tap operation) by the user on the control 21, the electronic device may start the camera to acquire an image and enable the AR translation function. FIG. 3(b) schematically illustrates a display interface 22 after the AR translation function is enabled. The display interface 22 displays language types of the AR translation application: translation between English and Chinese. A viewfinder frame 23 is also displayed in the display interface 22, and prompt information is displayed in the viewfinder frame 23: "Please align the text", to prompt the user to adjust a pose of the camera of the electronic device, so that the to-be-translated text is located in the viewfinder frame 23, to facilitate image acquisition.

Optionally, in this embodiment of this application, the electronic device may acquire images at a preset frequency, for example, the preset frequency may be acquiring 30 frames of images per second, may be acquiring 10 frames of images per second, or may be another frequency that meets a requirement, and a specific frequency for acquiring images may be determined according to an actual use requirement, which is not limited in this embodiment of this application.

S102: Translate the first to-be-translated text, to obtain a first translation result.

In this embodiment of this application, text content in the first image appears for the first time, and therefore the text content that appears for the first time needs to be translated.

Optionally, in some embodiments, the electronic device may invoke a local translation engine to translate the to-be-translated text, to obtain a translation result. Here, the translation engine may be a translation application installed in the electronic device for text translation. In some other embodiments, in a case in which the electronic device is networked, the electronic device may send the to-be-translated text to a server for text translation, and the server translates the to-be-translated text and sends a translation result to the electronic device, so that the electronic device obtains the translation result. It should be noted that for ease of description, an example in which an electronic device invokes a local translation engine to translate text is used for an exemplary description.

It may be understood that, in this step, translation software may be used for translating a language type of the to-be-translated text into another language type, to obtain a translation result. The specific method for translating the to-be-translated text in this step may be implemented in the same or similar method as the language translation method in the prior art. For example, in a case that the to-be-translated text is an English word, the English word may be inputted to the translation software, and the translation software is used to obtain relevant information such as a Chinese interpretation and an English pronunciation corresponding to the English word, in other words, the translation result. As long as a type of language text of to-be-translated text information can be translated into a type of a target language required by a user to obtain a translation result, the specific method is not limited in this embodiment of this application.

In this embodiment of this application, after the electronic device acquires the first image, the electronic device may first perform text recognition on the first image, to obtain the first to-be-translated text. Further, the electronic device may invoke a translation engine to translate the first to-be-translated text, to obtain the first translation result. Further, the electronic device may render the translation result of the first to-be-translated text, to obtain the first virtual image.

Exemplarily, the electronic device may perform text recognition on the acquired image by using an OCR technology. The OCR technology may generally include a text detection step and a text recognition step. The text detection step is mainly used for locating a position of text, and the text recognition step is mainly used for recognizing specific content of the text. In other words, text detection may be performed first to locate the position of the text and then the text recognition is performed, to obtain the specific content of the text. For a specific detailed step of performing the text recognition by using the OCR technology, reference may be made to an implementation step in the prior art, and details are not described herein again.

In other words, text is extracted from an input information stream by using the OCR, and then the translation engine is invoked to translate the text into target text information, to generate digital content.

S103: Display the first image on a display screen of the electronic device and display a first virtual image on the first image in a superimposed manner, where the first virtual image includes the first translation result.

In this way, the corresponding translation result is superimposed and displayed on the to-be-translated text by using the AR technology, to present a three-dimensional display effect.

S104: The camera acquires a second image, where the second image includes second to-be-translated text.

In this embodiment of this application, when an image is acquired again, the feature similarity between the currently acquired image and a previously acquired image is first compared with the preset similarity threshold, the pose change amount of the electronic device is compared with the preset pose threshold, and then based on the comparison result of the feature similarity and the comparison result of the pose change amount, whether the text in the currently acquired image needs to be fully translated or partially translated, or needs not to be translated is determined, so that different translation trigger strategies are selected to implement the translation process. For a specific translation trigger strategy, reference may be made to the following descriptions of S105A, S105B, and S105C.

It should be noted that steps S105A, S105B, and S105C are performed in alternative.

S105A: In a case that a pose change amount of the electronic device is less than a preset pose threshold and a feature similarity between the second image and the first image is greater than or equal to a preset similarity threshold, obtain the first translation result as a translation result of the second to-be-translated text.

Exemplarily, in a scenario in which a mobile phone does not move and read content remains unchanged, it may be determined that the pose change is small and the to-be-translated text does not change, in other words, the text has been translated before and has a corresponding translation result, and therefore the text does not need to be translated again by using a translation engine, and the previous translation result may be directly obtained; in this way, the computing resources can be greatly saved.

In this case, the text in the second image does not need to be translated, and there is no need to perform text recognition on the second image, no need to invoke a translation engine to perform translation, and no need to render the translation result.

S105B: In a case that a pose change amount of the electronic device is less than a preset pose threshold and a feature similarity is less than a preset similarity threshold, invoke a translation engine to translate the second to-be-translated text.

Exemplarily, in a scenario in which a mobile phone does not move and pages are turned for reading, it may be determined that the pose change is small, but the to-be-translated text changes greatly, in other words, the text has not been translated before and there is no corresponding translation result; therefore all of text in the current frame of image needs to be translated.

In this case, the text in the second image needs to be translated, and the electronic device may perform text recognition on the second image by using the OCR technology, to obtain the second to-be-translated text. Further, the electronic device may invoke a translation engine to translate the second to-be-translated text, to obtain the second translation result. Further, after the electronic device obtains the translation result of the second to-be-translated text, the electronic device may render the translation result of the second to-be-translated text, to obtain the second virtual image.

S105C: In a case that a pose change amount of the electronic device is greater than or equal to a preset pose threshold and a feature similarity is less than a preset similarity threshold, invoke a translation engine to translate part or all of text in the second to-be-translated text.

Exemplarily, in a scenario in which a mobile phone moves (for example, moves evenly, rotates, stretches far or near, and shakes) by a relatively large amplitude, it may be determined that the pose change is great, and to-be-translated content changes, where the to-be-translated content may be fully changed, or only part of the to-be-translated content may be changed; therefore, all or part of the text in a current frame of image needs to be translated.

In a scenario in which a pose change amount of the electronic device is greater than or equal to a preset pose threshold and a feature similarity is less than a preset similarity threshold, the following two cases may exist, and correspondingly there are two implementations:

Case 1: In a case that a first part of text in the second to-be-translated text is the same as the first to-be-translated text, the first translation result is obtained as a translation result of the first part of text; and a translation engine is invoked to translate a second part of text, to obtain a translation result of the second part of text, where the second part of text is text other than the first part of text in the second to-be-translated text; and the translation result of the second to-be-translated text includes the translation result of the first part of text and the translation result of the second part of text.

In the foregoing case 1, in a case that there is part of text content overlapped or duplicated between the current frame of image and a previous frame of image, text in the overlapped or duplicated part does not need to be translated, and the translation result does not need to be rendered.

Case 2: In a case that the second to-be-translated text and the first to-be-translated text do not have same text, a translation engine is invoked to translate all of text in the second to-be-translated text, to obtain the translation result of the second to-be-translated text.

In the foregoing case 2, in a case that there is no text content overlapped or duplicated between the current frame of image and the previous frame of image, all of text in the current frame of image needs to be translated.

Optionally, in this embodiment of this application, the electronic device may extract feature points in the first image and extract feature points in the second image. Then, the electronic device compares the feature points in the second image with the feature points in the first image, so that a feature similarity between the second image and the first image may be obtained.

In this way, feature extraction and matching are performed on the plurality of consecutive frames of images acquired, so as to determine a quantity of feature matches or a feature similarity between the plurality of consecutive frames of images. A greater quantity of feature matches or a greater feature similarity indicates a higher similarity between text content of two frames of images, and the same text content needs not to be translated.

Optionally, in this embodiment of this application, the electronic device may generate an SLAM map by using the SLAM method and determine pose information and a pose change amount of the electronic device based on the second image, measurement data of a target sensor in the electronic device, and the SLAM map. The pose information includes position information and posture information, and the pose change amount includes a position change amount and a posture change amount. By tracking the position and the posture of the electronic device in real time by the SLAM method, the pose change amount of the electronic device can be accurately calculated.

Optionally, in this embodiment of this application, the target sensor may be an inertial measurement unit (inertial measurement unit, IMU), an acceleration sensor, a gyroscope sensor, or any other sensor that meets a use requirement, for example, a proximity light sensor or a Hall sensor, which may be specifically determined according to an actual use requirement, and this is not limited in this embodiment of this application.

Figure 4:
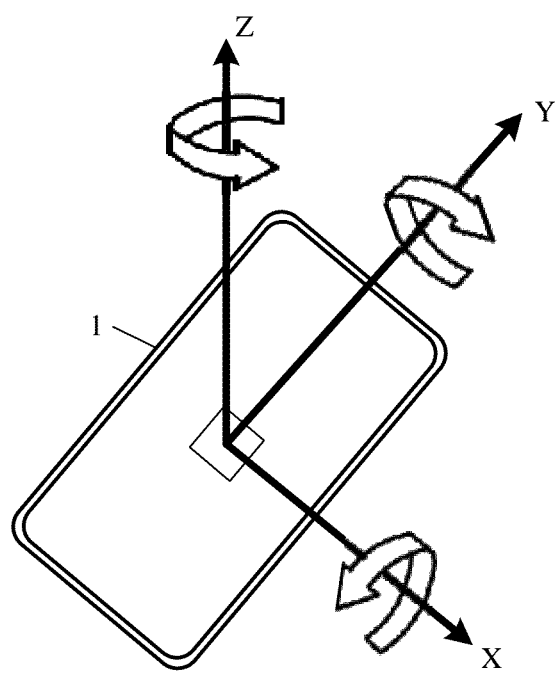
FIG. 4 is a schematic diagram of a pose change of an electronic device illustrated in combination with a coordinate system in an AR translation processing method according to an embodiment of this application.

Exemplarily, as shown in FIG. 4, the target sensor may determine a position and a position change amount of the electronic device 1 by detecting evenly moved distances in three directions of x, y, and z in a coordinate system. The target sensor may determine a posture and a posture change amount of the electronic device 1 by detecting rotation angles in three directions of x, y, and z in the coordinate system.

In an actual implementation, in a case that the electronic device moves, the SLAM system in the electronic device creates an SLAM map, and a sensor in the electronic device acquires motion data of the electronic device in real time. The electronic device may jointly determine a final pose and pose change amount of the electronic device based on the pose estimated by using the SLAM map and the pose estimated by the motion data acquired by the sensor.

It should be noted that in a case that the electronic device detects that the position change amount is less than the preset pose threshold and the posture change amount is less than the preset pose threshold, it may be considered that the pose change amount of the electronic device is less than the preset pose threshold.

It should be further noted that in a case that the electronic device detects that the position change amount is greater than or equal to the preset pose threshold and the posture change amount is greater than or equal to the preset pose threshold, it may be considered that the pose change amount of the electronic device is greater than or equal to the preset posture threshold. Alternatively, in a case that the electronic device detects that the position change amount is greater than or equal to the preset position threshold, it may also be considered that the pose change amount of the electronic device is greater than or equal to the preset pose threshold. Alternatively, in a case that the electronic device detects that the posture change amount is greater than or equal to the preset posture threshold, it may also be considered that the pose change amount of the electronic device is greater than or equal to the preset pose threshold.

As can be learned from the above, this embodiment of this application provides a reasonable translation trigger strategy: Comprehensive analysis is performed in combination with a result of SLAM tracking and locating of the electronic device and a result of content similarity comparison of the acquired image, to determine whether the text in the current frame of image needs to be fully translated or partially translated, or needs not to be translated. In this way, repeated translation can be effectively avoided, thereby saving computing resources in the AR translation process and improving the translation efficiency to a particular extent.

S106: Display, on a display screen, the second image and display a second virtual image on the second image in a superimposed manner, where the second virtual image includes the translation result of the second to-be-translated text.

Optionally, in this embodiment of this application, the electronic device may determine, by using an SLAM method, a target virtual plane for displaying AR digital content, where the target virtual plane is located above a plane where the acquired image is located. In this case, the electronic device may display the second virtual image on the target virtual plane, so that the second virtual image is displayed on the second image in a superimposed manner.

Exemplarily, by using a mobile phone as an example, the mobile phone may typically analyze a position and a posture of the mobile phone in space relative to a to-be-translated target, and construct a three-dimensional model of a spatial environment, so that even in a case that the position and the posture of the mobile phone change, the AR digital content may be accurately displayed in an image corresponding to the to-be-translated target in a superimposed manner.

In this embodiment of this application, the specific implementation of step S106 is: The electronic device may update and display the first image and the first virtual image that are displayed on the display screen as the second image and the second virtual image, and the second virtual image is displayed on the second image in a superimposed manner.

It should be noted that in S105A, in a case that it is detected that the pose change of the electronic device is small and the to-be-translated content does not change, there is no need to again perform translation, and a previous translation result may be directly obtained. In other words, in this case, the second image and the first image displayed on the display screen are images having substantially the same content, and the second virtual image displayed on the second image in a superimposed manner may be the same image as the first virtual image.

From the foregoing solution, it can be learned that the AR scenario may include a plane where the acquired image (including the to-be-translated text) is located and a plane where the virtual image (including the translation result) is located, and the two images are displayed in a superimposed manner, to achieve a three-dimensional display effect.

Optionally, in this embodiment of this application, the electronic device may determine a target projection region of the second to-be-translated text on the target virtual plane, so that the electronic device may display the second virtual image in the target projection region of the target virtual plane.

In this way, it can be learned that, by real-time tracking and performing position mapping on the to-be-translated text on the virtual plane, a position for displaying the translation result can be accurately located, and in this way, the to-be-translated text is ensured to positionally correspond to the translation result in real time; therefore, the AR display effect can be improved, which is convenient for a user to read.

Optionally, in this embodiment of this application, the electronic device may determine a first rectangular region occupied by the second to-be-translated text in the second image, determine, based on two endpoints on a diagonal of the first rectangular region, two anchor points of the two endpoints mapped on the target virtual plane, and a second rectangular region on the target virtual plane with a connecting line of the two anchor points as a diagonal, where the second rectangular region is a target projection region of the second to-be-translated text on the target virtual plane.

From the foregoing solution, it can be learned that, by mapping the rectangular region where the to-be-translated text is located onto the virtual plane, the rectangular display region on the virtual plane for displaying the translation result can be determined, and in this way, the to-be-translated text is ensured to positionally correspond to the translation result in real time; therefore, the AR display effect can be improved, which is convenient for a user to read.

Optionally, in this embodiment of this application, the electronic device may set a transparency of the target projection region to be less than or equal to a preset transparency threshold. The transparency is also referred to as transmittance, and a smaller transparency indicates a more apparent covering effect. The preset transparency threshold may be 30%, may be 10%, or may be 0%, where 0% represents complete opaque. Details can be determined according to an actual use requirement, which is not limited in this embodiment of this application.

In an actual implementation, the transparency of the target projection region is set to a relatively small value, so that the target projection region is opaque or semi-transparent, and in this way, the translation result can be displayed above the corresponding to-be-translated text and the translation result can overlap or cover the to-be-translated text, thereby preventing the to-be-translated text from causing visual interference or influence on the virtually displayed translation result; and therefore, it is convenient for a user to read, thereby improving the user experience.

By the foregoing solution, the translation result of the to-be-translated text can be rendered into virtual digital content, so as to display the virtual digital content on the virtual plane, thereby presenting an AR display effect.

In this embodiment of this application, by adding a positioning and tracking function, the rendered translation result is accurately matched with the original position, and the content under the angle of view is presented along with the change of the relative position, so that in a subsequent operation of a posture change, by a user, of rotating the electronic device, pulling the electronic device away or drawing the electronic device close or the like, an accurate display effect, such as the font size, the match degree, the smeared region, and the background difference, can be presented.

For a more overall intuitive understanding, the AR translation processing method provided in the embodiments of this application is described in detail below with reference to the system block diagram shown in FIG. 5.

Figure 5:
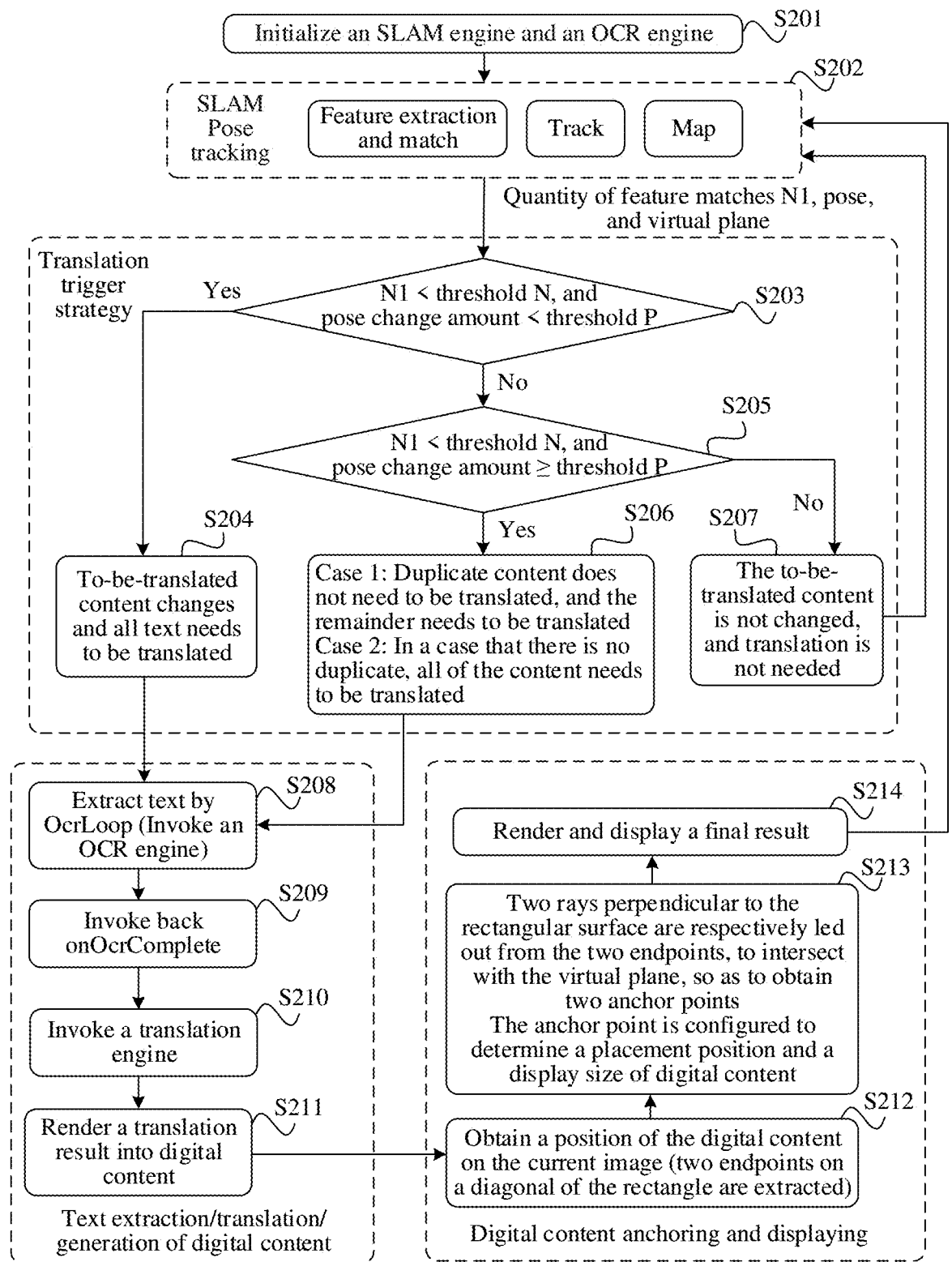
FIG. 5 is an overall schematic flowchart of an AR translation processing method according to an embodiment of this application.

As shown in FIG. 5, the system block diagram includes the following step S201 to S214, which can be grouped into five parts: initialization of SLAM and OCR engines, SLAM pose tracking, translation trigger strategy, text extraction/translation/generation of digital content, digital content anchoring and displaying.

S201: Initialize an SLAM engine and an OCR engine.

Assuming that the electronic device has an SLAM function and an OCR function, during enabling of the AR translation function by the electronic device, the SLAM function and the OCR function are enabled. In addition, the electronic device starts the camera to acquire an image.

S202: Perform pose tracking on the electronic device by the SLAM.

In a SLAM pose tracking process, feature extraction and matching, pose tracking, and map building are implemented, respectively.

Through feature extraction and matching, the quantity of feature matches (denoted as N1) of the acquired former and later frames of images can be obtained.

Through the pose tracking, pose information of the electronic device can be obtained, where the pose information includes a current position, a pose, a position change amount, and a posture change amount of the electronic device.

Optionally, in this embodiment of this application, the pose change information of the electronic device may be estimated by extracting feature points and performing feature point matching. Specifically, first, the feature points of the two successive key frames are extracted, and then the feature points are matched, and after the feature points are matched, two one-to-one corresponding pixel point sets can be obtained. Next, the pose change information of the electronic device is determined according to the two matched pixel point sets.

Through map building, a virtual digital plane can be generated for displaying the translation result.

In this way, feature extraction and matching are performed by using the acquired image and the data acquired by the IMU sensor, a pose of the current frame of image is calculated by using front-end tracking data and back-end map data, and a virtual digital plane is generated.

Then, a translation trigger strategy is executed, and discrimination analysis is performed by using the above pose information, the virtual digital plane, and the quantity of feature matches, to determine whether text needs to be fully translated or partially translated, or does not need to be translated. For a specific determining process, reference is made to the following steps S203-S207.

S203: Determine whether a quantity of feature matches N1 is less than a threshold (denoted as N), and whether a pose change amount (denoted as P1) is less than a threshold (denoted as P).

In a case that both the position change amount and the posture change amount are less than the corresponding thresholds, it may be considered that the pose change amount is less than the threshold.

If yes, the following step S204 is performed. If not, the following step S205 is performed.

S204: If N1 is less than N and P1 is less than P, it indicates that the to-be-translated content in the image changes, and therefore all the text in the image needs to be translated.

S205: Determine whether N1 is less than N, and whether P1 is greater than or equal to P.

In a case that the position change amount and/or the posture change amount are greater than or equal to the corresponding thresholds, it may be considered that the pose change amount is greater than or equal to the threshold.

If yes, the following step S206 is performed. If not, the following step S207 is performed.

S206: If N1 is less than N and P1 is greater than or equal to P, it indicates that a pose of the electronic device changes greatly, and therefore a part or all the text in the image needs to be translated.

Case 1: In a case that a current image has the same or duplicate content as a previously acquired image, the duplicate content does not need to be translated, and the remainder needs to be translated.

Case 2: In a case that there is no duplicate, all of the content needs to be translated.

S207: If N1 is greater than or equal to N and P1 is less than P, it indicates that the pose change of the electronic device is small, the to-be-translated content does not change, and therefore text in this frame of image does not need to be translated.

After S204 and S206, S208 below is continuously performed.

S208: Invoke an OCR engine and extract text from the image by using an OcrLoop program.

The purpose of text extraction can be achieved through steps such as image preprocessing, text detection, and text recognition.

In the process of image preprocessing, methods such as binarization, de-noising, and tilt angle detection correction can be used to preprocess the acquired image.

In the process of text detection, a conventional connected region algorithm or a deep learning algorithm can be used to obtain the position of a text region.

In the process of text recognition, the content in the text region can be obtained based on a deep learning OCR algorithm.

In combination with the situation in S204, all of text in the image needs to be extracted. In combination with the situation in S206, part or all of text in the image needs to be extracted.

S209: Invoke back an onOcrComplete program to complete text extraction.

S210: Invoke a translation engine to translate text obtained through recognition.

The process mainly includes invoking the translation engine to translate the text content extracted in S209 into a target language.

S211: Render a translation result into digital content.

The translation result obtained in S210 is subjected to conversion processing, to generate digital content that can be displayed virtually. In an actual implementation, the digital content may be a virtual image.

In this way, text extraction, translation, and processing of a translation result into digital content are completed by S208-S211.

S212: Obtain a position of the digital content on the current image. For example, two endpoints on a diagonal of a rectangle where the digital content is located may be selected.

S213: Two rays perpendicular to the rectangular surface are respectively led out from the two endpoints, to intersect with the virtual plane, so as to obtain two anchor points. The two anchor points may be used to determine a placement position and a display size of the digital content on the virtual plane.

S214: Render and display a final result on the virtual plane.

Further, S202 to S214 are repeated to perform AR translation.

By the AR translation processing method provided in this embodiment of this application, in a scenario in which an electronic device is used for AR translation, a pose change of the electronic device can be detected in real time, and feature matching can be performed on a plurality of consecutive frames of images acquired by a camera, so that whether to-be-translated text needs to be fully translated or partially translated or needs not to be translated can be determined based on the pose change of the electronic device and a feature matching result, and therefore a corresponding translation trigger strategy is selected. In this way, repeated translation can be effectively avoided, thereby saving computing resources in the AR translation process and improving the translation efficiency to a particular extent.

The following exemplarily describes translation display results of different relative poses of the electronic device and the to-be-translated target in an AR translation scenario of this embodiment of this application in combination with FIG. 6 to FIG. 9.

Figure 6:
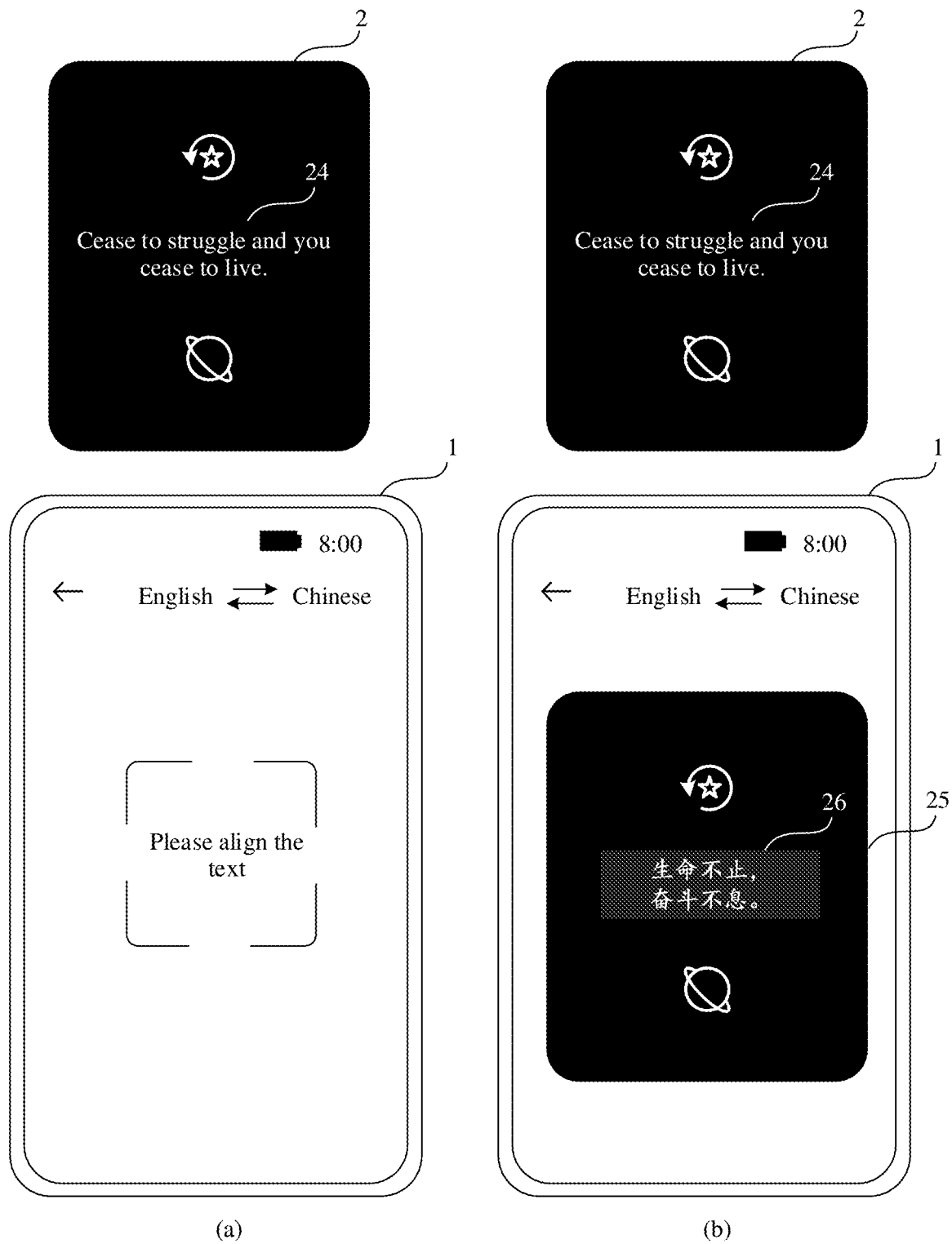
FIG. 6 is a schematic diagram of interaction interfaces in a scenario in which an electronic device acquires an image and extracts text for translation during AR translation according to an embodiment of this application.

FIG. 6 is a schematic diagram of interaction interfaces in a scenario in which an electronic device acquires an image and extracts text for translation during AR translation.

As shown in FIG. 6(a), an electronic device 1 enables an AR translation function, and a camera is opened and is aligned with a to-be-translated target 1 for acquiring an image. A to-be-translated target 1 includes text 24 "Cease to struggle and you cease to live". The electronic device 1 extracts the text from an acquired image, invokes a translation engine to translate, and obtains a translation result of "生命不止，奋斗不息". Further, the translation result is rendered into digital content, to form a virtual image. As shown in FIG. 6(b), the electronic device 1 displays an acquired entity image 25 on the display screen, and displays, on the entity image 25, a virtual image 26 corresponding to the translation result in a superposed manner.

The virtual image 26 may cover or shield a text region during displaying, and graphics in the entity image 25 except the text may be displayed normally and is not to be shielded by the virtual image 26.

Figure 7:
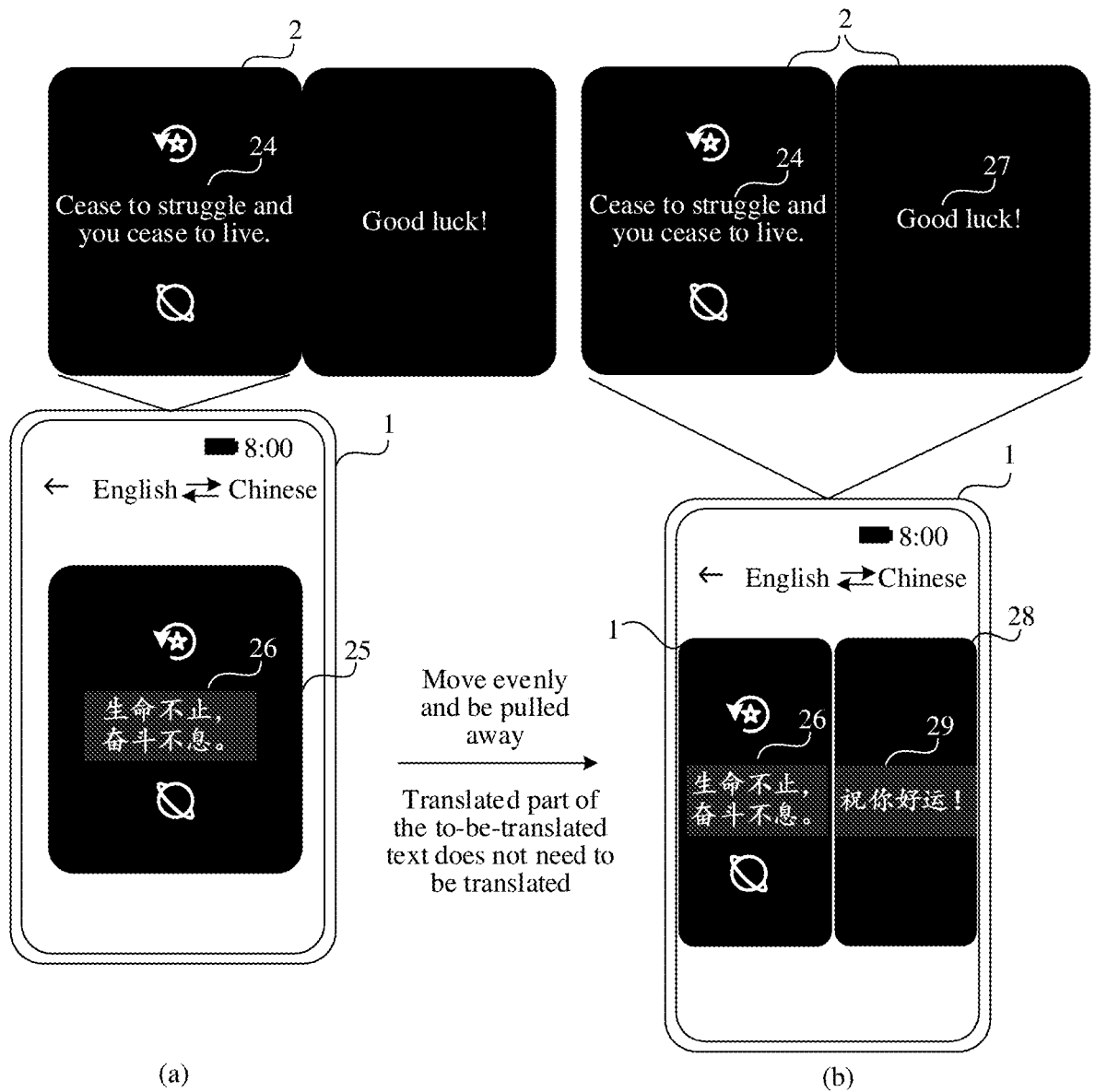
FIG. 7 is a schematic diagram of interaction interfaces in a scenario in which after a pose change of an electronic device, image content changes and there is repetition in the content during AR translation according to an embodiment of this application.

FIG. 7 is a schematic diagram of interaction interfaces in a scenario in which after a pose change of an electronic device, image content changes and there is repetition in the content during AR translation. In this scenario, the translated part of the to-be-translated text does not need to be translated.

As shown in FIG. 7(a), the electronic device 1 acquires an image of the to-be-translated target 1, the image of the to-be-translated target 1 includes text 24, and after the above processes of text extraction, translation, and generation of digital content, the display screen of the electronic device 1 displays a three-dimensional image obtained by superimposing the entity image 25 and the virtual image 26. The virtual image 26 is a translation result corresponding to the text 24.

The electronic device 1 continues to acquire an image, and in this case, it is detected that the electronic device 1 moves evenly along a particular direction and is pulled away from the to-be-translated target 1, and content of the image of the to-be-translated target 1 acquired by the electronic device 1 changes. As shown in FIG. 7(b), the image of the to-be-translated target 1 not only includes the text 24, but also includes the text 27 "Good luck!". Since the text 24 is already translated content, there is no need to translate the text 24, and in this case, only text 27 needs to be translated. As shown in FIG. 7(b), the electronic device 1 displays the acquired entity image 28 on the display screen, and displays, on the entity image 28, the virtual image 26 corresponding to the translation result of the text 24 and a virtual image 29 ("祝你好运！") corresponding to a translation result of the text 27 in a superimposed manner.

Figure 8:
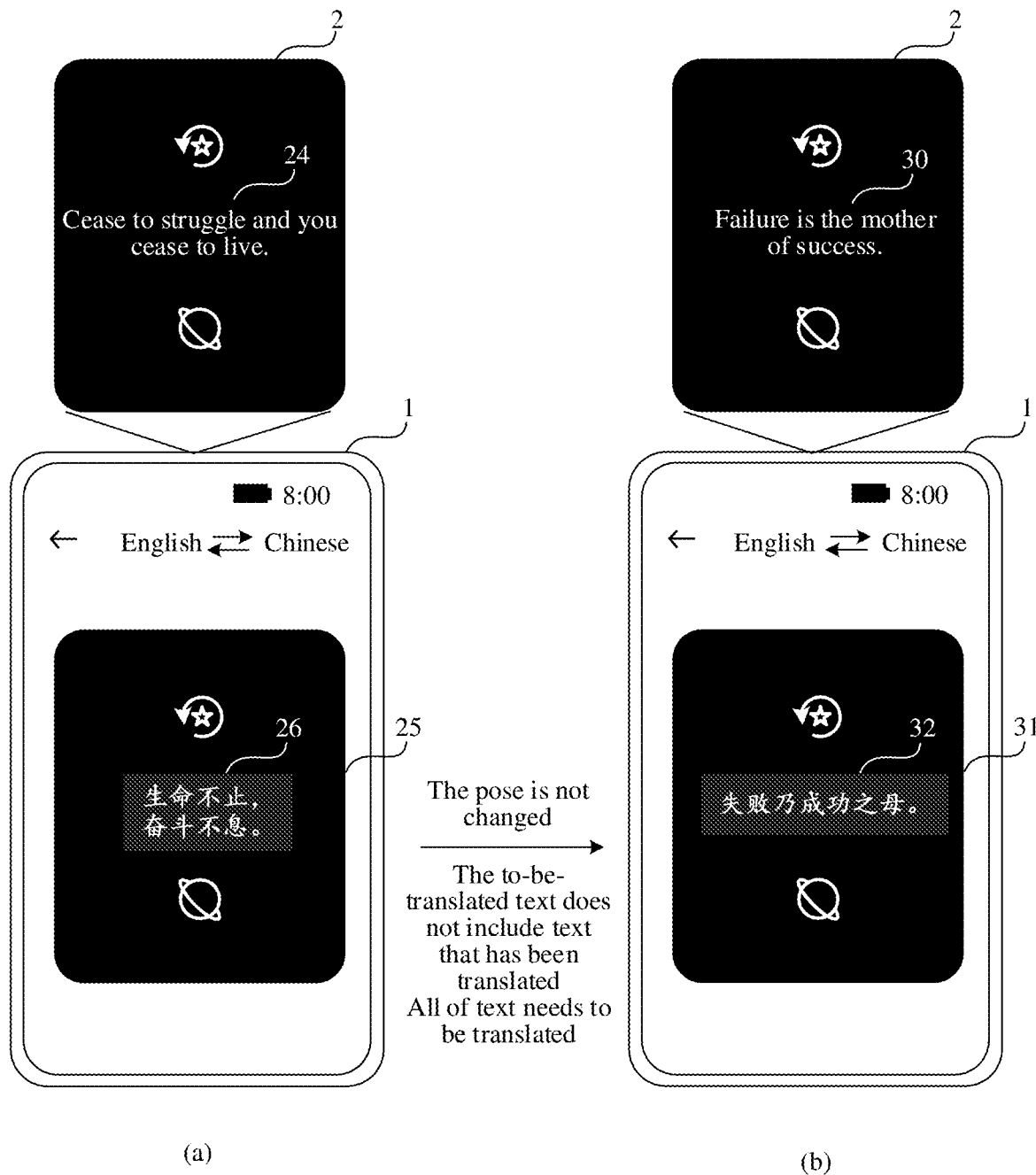
FIG. 8 is a schematic diagram of interaction interfaces in a scenario in which a pose change of the electronic device is relatively small, image content changes, and there is no repetition in the content during AR translation according to an embodiment of this application.

FIG. 8 is a schematic diagram of interaction interfaces in a scenario in which a pose change of an electronic device is relatively small, image content changes, and there is no repetition in the content during AR translation. In this scenario, the to-be-translated text does not include text that has been translated and needs to be fully translated.

As shown in FIG. 8(a), the electronic device 1 acquires an image of the to-be-translated target 1, the image of the to-be-translated target 1 includes text 24, and after the above processes of text extraction, translation, and generation of digital content, the display screen of the electronic device 1 displays a three-dimensional image obtained by superimposing the entity image 25 and the virtual image 26. The virtual image 26 is a translation result corresponding to the text 24.

The electronic device 1 continues to acquire an image, and in this case, it is detected that a pose of the electronic device 1 is unchanged or has a small change, but content of the image of the to-be-translated target 1 acquired by the electronic device 1 changes. As shown in FIG. 8(b), the image of the to-be-translated target 1 changes from the text 24 to text 30. Here, since the text 30 is content that has not been translated, translation is needed. As shown in FIG. 8(b), the electronic device 1 displays an acquired entity image 31 on the display screen, and displays, on the entity image 31, a virtual image 32 corresponding to a translation result of the text 30 in a superposed manner.

Figure 9:
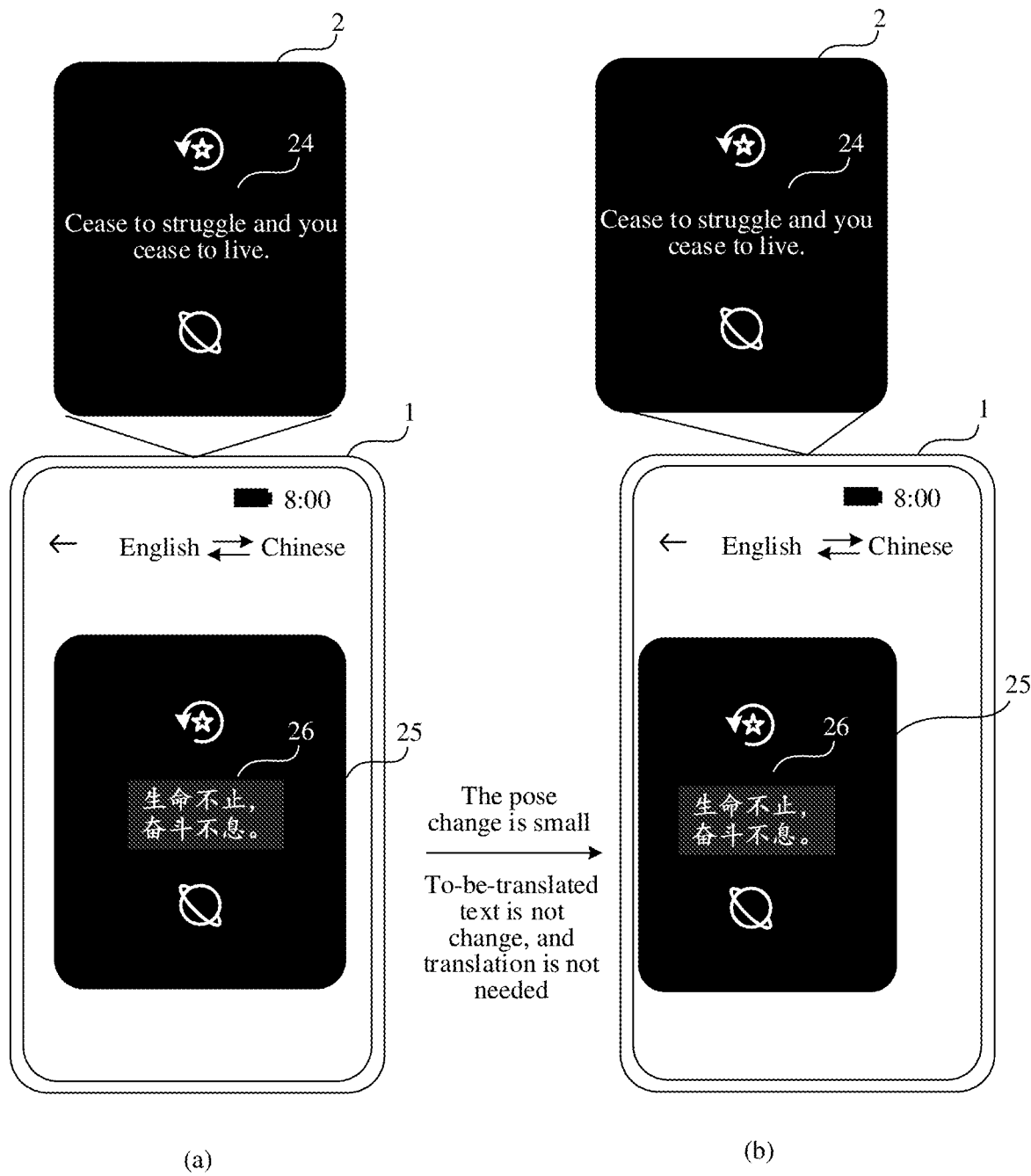
FIG. 9 is a schematic diagram of interaction interfaces in a scenario in which a pose change of an electronic device is relatively small and image content remains unchanged during AR translation according to an embodiment of this application.

FIG. 9 is a schematic diagram of interaction interfaces in a scenario in which a pose change of an electronic device is relatively small and image content remains unchanged during AR translation. In this scenario, the to-be-translated text is already translated text and does not need to be translated.

As shown in FIG. 9(a), the electronic device 1 acquires an image of the to-be-translated target 1, the image of the to-be-translated target 1 includes text 24, and after the above processes of text extraction, translation, and generation of digital content, the display screen of the electronic device 1 displays a three-dimensional image obtained by superimposing the entity image 25 and the virtual image 26. The virtual image 26 is a translation result corresponding to the text 24.

The electronic device 1 continues to acquire an image, and in this case, it is detected that a pose of the electronic device 1 is unchanged or has a small change, and content of the image of the to-be-translated target 1 acquired by the electronic device 1 is unchanged. As shown in FIG. 9(b), the image of the to-be-translated target 1 includes the text 24. Since the text 24 is already translated content, translation is not needed. As shown in FIG. 9(b), the electronic device 1 still displays the acquired entity image 25 on the display screen, and displays, on the entity image 25, a virtual image 26 corresponding to a translation result of the text 24 in a superimposed manner.

It should be noted that in the embodiments of this application, the following problems are solved by tracking and locating a device SLAM and setting a reasonable translation trigger strategy: (1) translated digital content may drift and mismatch, and a font format and a font size jump; and (1) repeated translation causes a high end-side algorithm scheduling overhead, which increases traffic loss and cloud computing resource usage.

For above problem (1): In the prior art, in an AR translation process, in a case that a posture of a user holding or wearing an AR device changes (for example, moves, rotates, stretches far or near, or shakes), phenomena such as translation result drifting and mismatching, and font format and font size jumping may appear, and therefore, a 3D translation effect is poor, which affects user experience.

In the solution of this application, after the translation result is rendered into digital content, the digital content is directly covered on a corresponding position of original content. In a case that the position of the translation result changes relative to the original content, the translation result is not pasted mechanically. Instead, pose changes of the translation result and the original content need to be tracked and located. In a case that the relative pose change of the translation result and the original content exceeds a preset threshold, translation needs to be performed again, to display a new translation result. In a case that the relative pose change of the translation result and the original content is small, the translation result translated the last time is accurately covered on a corresponding position of the current image by using the positioning and tracking technology.

Compared with the prior art, in the embodiments of this application, by anchoring the digital content and the SLAM virtual plane, performing real-time SLAM tracking, and combining with the position/posture of the electronic device, the display position of the translation result can be accurately located, so as to avoid the phenomena such as translation result drifting and mismatching, and font format and font size jumping.

For above problem (2): Compared with the real-time frame-by-frame translation method in the prior art, in the solution of this application, first the acquired images are analyzed, to determine whether the content in the former and later frames of images changes, and to determine whether all content needs to be translated. For example, translation may not be needed for an image having a small content change, which can reduce algorithm scheduling overhead and save computing resources.

In the solution of this application, relative pose information of the camera and the object to be photographed is located and tracked in real time, and in a case that the pose change is less than the preset threshold, the translation result of the first time is dynamically displayed on the current image in a superimposed manner without an additional translation process; and in a case that the pose change is greater than the preset threshold, image recognition and translation are performed again, and newly translated content is displayed on the current image in a superimposed manner.

Figure 10:
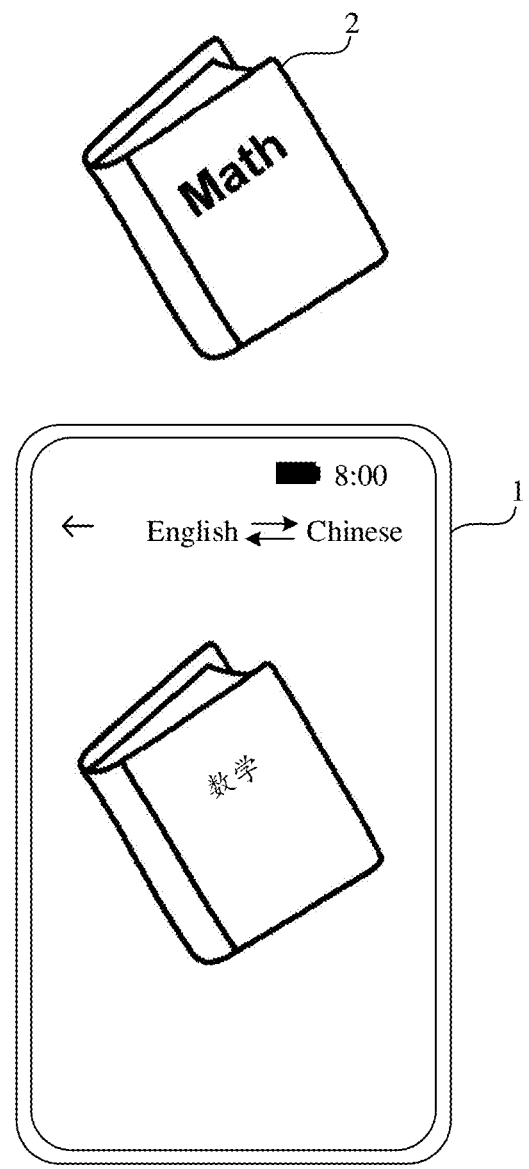
FIG. 10 is a schematic diagram that schematically illustrates an interface of performing AR translation by using a solution of this application.

FIG. 10 is a schematic diagram that schematically illustrates an interface of performing AR translation by using a solution of this application. As shown in FIG. 10, after the electronic device enables the AR translation function, the electronic device acquires an image (referred to as an original image), extracts text content "math" from the image, and translates the text content, to obtain a translation result "数学". Then, the electronic device displays the translation result of the text on the original image in a in superposed manner, to present an AR display effect.

Based on the description of the above embodiments, it can be known that by performing AR translation by using the solution of this application, in a case that the mobile phone held by a user is unstable, for example, is shaking and rotating, a smeared region and background having an accurate translation font size, a good fitting effect, and a small difference can be displayed, which are correspondingly matched with the to-be-translated target in real time. Moreover, the algorithm scheduling overhead can be reduced, so that the jam, time consuming, and power consumption can be reduced.

It should also be noted that in the embodiments of this application, "greater than" may be replaced with "greater than or equal to", and "less than or equal to" may be replaced with "less than". Alternatively, "greater than or equal to" may be replaced with "greater than", and "less than" may be replaced with "less than or equal to".

Each embodiment described herein may be an independent solution, or may be combined based on an internal logic, and such solutions all fall within the protection scope of this application.

It may be understood that, the methods and operations implemented by the electronic device in the foregoing method embodiments may also be implemented by a component (for example, a chip or a circuit) that can be used in the electronic device.

The method embodiments provided in this application are described above, and apparatus embodiments provided in this application are described below. It should be understood that the description of the apparatus embodiments correspond to the description of the method embodiments. Therefore, for content not described in detail, reference may be made to the foregoing method embodiments. For brevity, this is not repeated herein.

The solutions provided in the embodiments of this application are mainly described above from a perspective of method steps. It may be understood that, to implement the foregoing functions, the electronic device implementing the method includes corresponding hardware structures and/or software modules for performing the functions. A person skilled in the art may aware that, in combination with the units and algorithm steps of the examples described in the embodiments disclosed in this specification, this application can be implemented by hardware or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation goes beyond the protection scope of this application.

In the embodiments of this application, functional modules of the electronic device may be divided based on the foregoing method examples. For example, each functional module may be correspondingly divided based on each function, or two or more functions may be integrated into one processing module. The integrated module may be implemented in the form of hardware, or may be implemented in a form of a software functional module. It should be noted that the module division in the embodiments of this application is an example, and is only logical function division. During actual implementation, there may be another division manner. The following descriptions are made by using an example in which functional modules are divided corresponding to functions.

Figure 11:
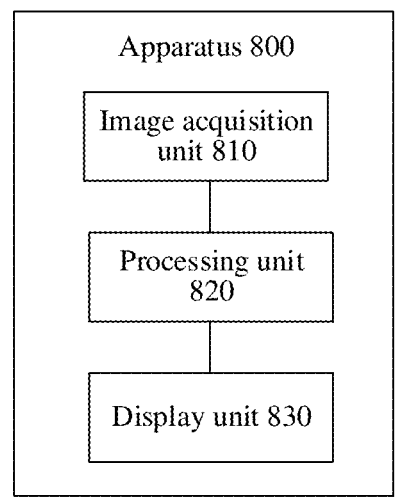
FIG. 11 is a schematic structural diagram of an AR translation processing apparatus according to an embodiment of this application.

FIG. 11 is a schematic block diagram of an AR translation processing apparatus 800 according to an embodiment of this application. The apparatus 800 may be configured to perform actions performed by the electronic device in the foregoing method embodiments. The apparatus 800 includes an image acquisition unit 810, a processing unit 820, and a display unit 830.

The image acquisition unit 810 is configured to acquire a first image, where the first image includes the first to-be-translated text.

The processing unit 820 is configured to invoke a translation engine to translate the first to-be-translated text, to obtain the first translation result.

The display unit 830 is configured to display the first image on a display screen of the apparatus 800 and display a first virtual image on the first image in a superimposed manner, where the first virtual image includes the first translation result.

The image acquisition unit 810 is further configured to acquire, by the camera, a second image, where the second image includes the second to-be-translated text;

The processing unit 820 is further configured to: in a case that a pose change amount of the apparatus 800 is less than a preset pose threshold and a feature similarity between the second image and the first image is greater than or equal to a preset similarity threshold, obtain the first translation result as a translation result of the second to-be-translated text; or in a case that a pose change amount of the apparatus 800 is less than a preset pose threshold and a feature similarity is less than a preset similarity threshold, invoke a translation engine to translate the second to-be-translated text; or in a case that a pose change amount of the apparatus 800 is greater than or equal to a preset pose threshold and a feature similarity is less than a preset similarity threshold, invoke a translation engine to translate part or all of text in the second to-be-translated text.

The display unit 830 is further configured to display, on the display screen, the second image and display a second virtual image on the second image in a superimposed manner, where the second virtual image includes the translation result of the second to-be-translated text.

By the solution provided in this embodiment of this application, in a scenario in which an electronic device is used for AR translation, the pose change of the electronic device can be detected in real time, and feature matching can be performed on a plurality of consecutive frames of images acquired by the camera, so that whether to-be-translated text needs to be fully translated or partially translated, or needs not to be translated can be determined based on the pose change of the electronic device and a feature matching result, and therefore a corresponding translation trigger strategy is selected. In this way, repeated translation can be effectively avoided, thereby saving computing resources in the AR translation process and improving the translation efficiency to a particular extent.

Exemplarily, in a scenario in which a mobile phone does not move and read content remains unchanged, it may be determined that the pose change is small and the to-be-translated text does not change; therefore, translation does not need to be translated again, and a previous translation result can be directly obtained, thereby greatly saving computing resources.

Still exemplarily, in a scenario in which a mobile phone does not move and pages are turned for reading, it may be determined that the pose change is small, but the to-be-translated text changes greatly; therefore, all of text in a current frame of image needs to be translated.

Still exemplarily, in a scenario in which a mobile phone moves (for example, moves evenly, rotates, stretches far or near, or shakes) by a relatively large amplitude, it may be determined that the pose change is great, and to-be-translated content changes; therefore, all or part of the text in a current frame of image needs to be translated.

In a scenario in which a pose change amount of the electronic device is greater than or equal to a preset pose threshold and a feature similarity is less than a preset similarity threshold, the following two cases may exist, and correspondingly there are two implementations:

In a possible implementation, the invoking a translation engine to translate part or all of text in the second to-be-translated text includes:

in a case that a first part of text in the second to-be-translated text is the same as the first to-be-translated text, obtaining the first translation result as a translation result of the first part of text; and invoking a translation engine to translate a second part of text, to obtain a translation result of the second part of text, where the second part of text is text other than the first part of text in the second to-be-translated text; and the translation result of the second to-be-translated text includes the translation result of the first part of text and the translation result of the second part of text.

In the foregoing case 1, in a case that there is part of text content overlapped or duplicated between the current frame of image and a previous frame of image, text in the overlapped or duplicated part does not need to be translated.

In another a possible implementation, the invoking a translation engine to translate part or all of text in the second to-be-translated text includes:

in a case that the second to-be-translated text and the first to-be-translated text do not have same text, invoking a translation engine to translate all of text in the second to-be-translated text, to obtain the translation result of the second to-be-translated text.

In the foregoing case 2, in a case that there is no text content overlapped or duplicated between the current frame of image and the previous frame of image, all of text in the current frame of image needs to be translated.

In a possible implementation, the processing unit 820 is further configured to:

extract feature points in the first image and feature points in the second image; and compare the feature points in the second image with the feature points in the first image, to obtain the feature similarity between the second image and the first image.

By the foregoing solution, feature extraction and matching may be performed on the plurality of consecutive frames of images acquired, so as to determine a quantity of feature matches or a feature similarity between the plurality of consecutive frames of images, so as to determine, based on the feature similarity, whether text in a current image needs to be fully translated or partially translated, or needs not to be translated below.

In a possible implementation, the processing unit 820 is further configured to:

generate an SLAM map by using a simultaneous localization and mapping SLAM method; and based on the second image, measurement data of a target sensor in the electronic device, and the SLAM map, determine a pose change amount of the electronic device, where the target sensor includes an IMU sensor. Certainly, the target sensor may further include any other sensor that meets an actual use requirement, such as a gyroscope sensor or an acceleration sensor, which is not limited in this application.

In another possible implementation, the pose change amount includes a position change amount and a posture change amount.

By tracking the position and the posture of the electronic device in real time by the SLAM method, the pose change amount of the electronic device can be accurately calculated.

In a possible implementation, the processing unit 820 is further configured to:

determine, by using an SLAM method, a target virtual plane for displaying AR digital content, where the target virtual plane is located above a plane where the acquired image is located; and the displaying a second virtual image on the second image in a superimposed manner includes:

displaying the second virtual image on the target virtual plane.

From the foregoing solution, it can be learned that the AR scenario may include a plane where the acquired image (including the to-be-translated text) is located and a plane where the virtual image (including the translation result) is located, and the two images are displayed in a superimposed manner, to achieve a three-dimensional display effect.

In a possible implementation, the processing unit 820 is further configured to:

determine a target projection region of the second to-be-translated text on the target virtual plane, where the displaying the second virtual image on the target virtual plane includes:

displaying the second virtual image in the target projection region.

From the foregoing solution, it can be learned that, by real-time tracking and performing position mapping on the to-be-translated text on the virtual plane, a position for displaying the translation result can be accurately located, and in this way, the to-be-translated text is ensured to positionally correspond to the translation result in real time; therefore, the AR display effect can be improved, which is convenient for a user to read.

In a possible implementation, the determining a target projection region of the second to-be-translated text on the target virtual plane includes:

determining a first rectangular region occupied by the second to-be-translated text in the second image;

based on two endpoints on a diagonal of the first rectangular region, determining two anchor points of the two endpoints mapped on the target virtual plane; and determining a second rectangular region on the target virtual plane with a connecting line of the two anchor points as a diagonal, where the second rectangular region is a target projection region of the second to-be-translated text on the target virtual plane.

From the foregoing solution, it can be learned that, by mapping the rectangular region where the to-be-translated text is located onto the virtual plane, the rectangular display region on the virtual plane for displaying the translation result can be determined, and in this way, the to-be-translated text is ensured to positionally correspond to the translation result in real time; therefore, the AR display effect can be improved, which is convenient for a user to read.

In a possible implementation, the processing unit 820 is further configured to set a transparency of the target projection region to be less than or equal to a preset transparency threshold.

By the foregoing solution, the transparency of the target projection region can be reduced, so that the target projection region is opaque or translucent, and in this way, the translation result can be displayed above the corresponding to-be-translated text, and can overlap or cover the to-be-translated text, thereby preventing the to-be-translated text from causing visual interference or influence on the virtually displayed translation result; and therefore, it is convenient for a user to read, thereby improving the user experience.

In a possible implementation, the processing unit 820 is further configured to:

perform text recognition on the first image, to obtain the first to-be-translated text; and perform text recognition on the second image, to obtain the second to-be-translated text.

Exemplarily, the OCR technology may be used for text recognition.

In a possible implementation, the processing unit 820 is further configured to:

render the translation result of the first to-be-translated text, to obtain the first virtual image; and render the translation result of the second to-be-translated text, to obtain the second virtual image.

By the foregoing solution, the translation result of the to-be-translated text can be rendered into virtual digital content, so as to display the virtual digital content on the virtual plane, thereby presenting an AR display effect.

The apparatus 800 according to this embodiment of this application may correspondingly perform the method described in the embodiments of this application, and the foregoing and other operations and/or functions of the units in the apparatus 800 are respectively used for implementing corresponding procedures in the method. For brevity, details are not described herein again.

Figure 12:
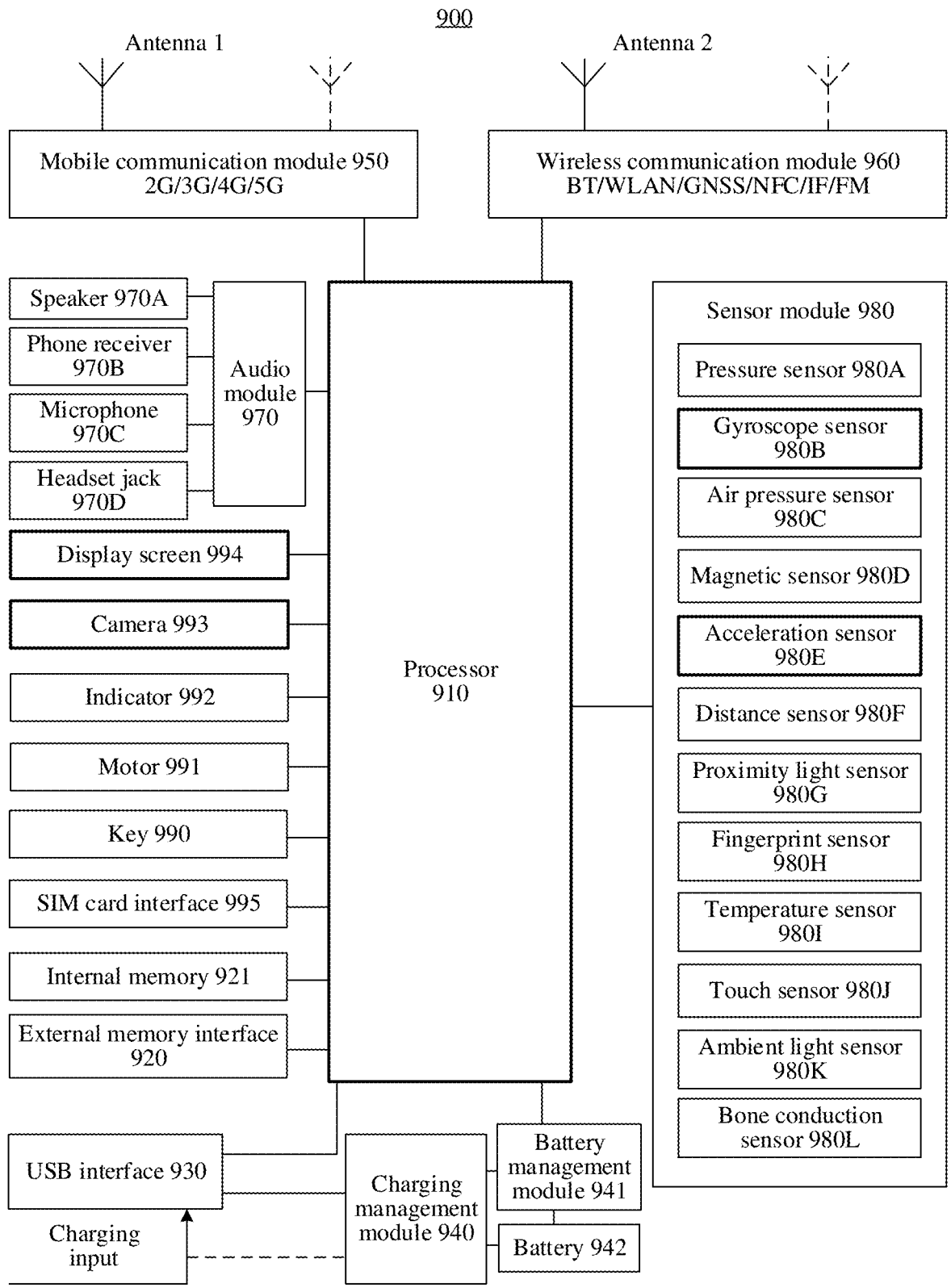
FIG. 12 is a schematic structural diagram of an electronic device according to an embodiment of this application.

FIG. 12 is a schematic structural diagram of an electronic device 900 according to an embodiment of this application. The electronic device 900 may include a processor 910, an external memory interface 920, an internal memory 921, a universal serial bus (universal serial bus, USB) interface 930, a charging management module 940, a power management unit 941, a battery 942, an antenna 1, an antenna 2, a mobile communication module 950, a wireless communication module 960, an audio module 970, a speaker 970A, a phone receiver 970B, a microphone 970C, a headset jack 970D, a sensor module 980, a key 990, a motor 991, an indicator 992, a camera 993, a display screen 994, a subscriber identity module (subscriber identification module, SIM) card interface 995, and the like. The sensor module 980 may include a pressure sensor 980A, a gyroscope sensor 980B, an air pressure sensor 980C, a magnetic sensor 980D, an acceleration sensor 980E, a distance sensor 980F, a proximity light sensor 980G, a fingerprint sensor 980H, a temperature sensor 980I, a touch sensor 980J, an ambient light sensor 980K, a bone conduction sensor 980L, and the like.

It may be understood that an example structure in this embodiment of this application does not constitute a specific limitation on the electronic device 900. In some other embodiments of this application, the electronic device 900 may include more or fewer components than those shown in the figure, or some components may be combined, or some components may be divided, or different component arrangements may be used. The components in the portrait may be implemented by hardware, software, or a combination of software and hardware.

The processor 910 may include one or more processing units. The processor 910 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be separate devices, or may be integrated into one or more processors. The controller may be a nerve center and a command center of the electronic device 900. The controller may generate an operation control signal (for example, a control signal for image acquisition, a control signal for text extraction, a control signal for text translation, or a control signal for image rendering and display) based on instruction operation code and a timing signal, to implement control of fetching instructions and executing the instructions.

The processor 910 may also be provided with a memory for storing instructions and data, for example, for storing image data acquired during the AR translation process and text translation results. In some embodiments, the memory in processor 910 is a cache memory. The memory may store instructions or data that is just used or cyclically used by the processor 910. In a case that the processor 910 needs to use the instructions or the data again, the processor may directly invoke the instructions or the data from the memory, which avoids repeated access and reduces a waiting time of the processor 910, thereby improving system efficiency.

The processor 910 may be configured to execute the foregoing program code, and invoke a related module to implement the AR translation function of the electronic device in this embodiment of this application.

In some embodiments, the processor 910 may include one or more interfaces. The interface may include an inter-integrated circuit (inter-integrated circuit, I2C) interface, a pulse code modulation (pulse code modulation, PCM) interface, a universal asynchronous receiver/transmitter (universal asynchronous receiver/transmitter, UART) interface, a general-purpose input/output (general-purpose input/output, GPIO) interface, and/or a universal serial bus (universal serial bus, USB) interface, or the like. It may be understood that a schematic interface connection relationship between the modules in the embodiments of this application is merely an example for description, and constitutes no limitation on the structure of the electronic device 900. In some other embodiments of this application, the electronic device 900 may alternatively use an interface connection manner different from that in the foregoing embodiment, or use a combination of a plurality of the interface connection manners.

The electronic device 900 implements a display function by using the GPU, the display screen 994, the application processor, and the like. The GPU is a microprocessor for image processing and connects the display screen 994 and the application processor. The GPU is configured to perform mathematical and geometric calculations, and is configured to render graphics. The processor 910 may include one or more GPUs, and execute program instructions to generate or change display information.

The display screen 994 is configured to display an image, a video, or the like, for example, to display an AR translation result. The display screen 994 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a Micro-Led, a Micro-oLed, quantum dot light emitting diodes (quantum dot light emitting diodes, QLED), and the like. In some embodiments, the electronic device 900 may include 1 or N display screens 994. N is a positive integer greater than 1.

The electronic device 900 can implement a photographing function by using the ISP, the camera 993, the video codec, the GPU, the display screen 994, the application processor, and the like.

The ISP is configured to process data fed back by the camera 993. For example, during acquisition of an AR image, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into a real-world image and a virtual image visible to a naked eye. The ISP may further perform algorithm optimization on noise point, brightness, and skin tone of the images. The ISP may further optimize parameters such as exposure and color temperature of a photographed scene. In some embodiments, the ISP may be arranged in the camera 993.

The camera 993 is configured to capture a still image or video, for example, configured to acquire an image of to-be-translated text during AR translation. An optical image is generated for an object by using the lens and is projected onto the photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in standard RGB and YUV formats. In some embodiments, the electronic device 900 may include 1 or N cameras 993, and N is a positive integer greater than 1.

The digital signal processor is configured to process a digital signal, and in addition to a digital image signal, the digital signal processor may further process another digital signal. The NPU is a neural-network (neural-network, NN) computing processor that processes input information rapidly by referring to a structure of a biological neural network, for example, by referring to a transmission mode between human brain neurons, and can further perform self-learning continuously. The NPU may be used to implement an application such as intelligent cognition of the electronic device 900, for example, image recognition, text recognition, and text understanding.

The external memory interface 920 may be configured to connect to an external memory card, for example, a micro SD card, to expand a storage capability of the electronic device 900. The external memory card communicates with the processor 910 by using the external memory interface 920, to implement a data storage function, for example, files such as image data and a text translation result acquired during the AR translation are stored in an external memory card.

The internal memory 921 may be configured to store computer-executable program cod. The executable program code includes an instruction. The processor 910 runs the instructions stored in the internal memory 921, to implement various functional applications and data processing of the electronic device 900. The internal memory 921 may include a program storage area and a data storage area. The program storage area may store an operating system, an application required by at least one function (for example, an AR translation function), and the like. The data storage region may store data (for example, AR-related image data) and the like created during a use process of the electronic device 900. In addition, the internal memory 921 may include a high-speed random access memory, or may include a non-volatile memory, for example, at least one magnetic disk component, a flash memory component, or a universal flash storage (universal flash storage, UFS).

The pressure sensor 980A is configured to sense a pressure signal, and can convert the pressure signal into an electrical signal. In some embodiments, the pressure sensor 980A may be disposed on the display screen 994. There are many types of pressure sensors 980A, such as a resistive pressure sensor, an inductive pressure sensor, and a capacitive pressure sensor. The capacitive pressure sensor may be a parallel plate including at least two conductive materials. In a case that a force is applied onto the pressure sensor 980A, a capacitance between electrodes changes. The electronic device 900 determines pressure strength based on a change in the capacitance. In a case that a touch operation is performed on the display screen 994, the electronic device 900 detects strength of the touch operation by using the pressure sensor 980A. The electronic device 900 may also calculate a touch position based on a detection signal of the pressure sensor 980A. In some embodiments, touch operations that are applied to a same touch position but have different touch operation intensity may correspond to different operation instructions. For example, in a case that a touch operation whose touch operation strength is greater than or equal to the first pressure threshold is performed on the AR translation application icon, an instruction of enabling an AR translation application is executed.

The gyroscope sensor 980B may be configured to determine a motion posture of the electronic device 900. In some embodiments, angular velocities of the electronic device 900 around three axes (for example, x, y, and z axes) may be determined by using the gyroscope sensor 980B, so as to determine a pose of the electronic device 900. The gyroscope sensor 980B may be used for photographing anti-shaking during photographing. Exemplarily, in a case that the shutter is pressed, the gyroscope sensor 980B detects an angle at which the electronic device 900 shakes, and calculates, based on the angle, a distance for which a lens module needs to compensate, and allows the lens to cancel the jitter of the electronic device 900 through reverse motion, thereby implementing image stabilization. The gyroscope sensor 980B may also be used in navigation and a motion sensing game scenario.

The acceleration sensor 980E may detect an acceleration value of the electronic device 900 all directions (generally in three axes). The size and direction of gravity can be detected when the electronic device 900 is still, can also be used for detecting the posture of electronic device, and is applied to an application such as horizontal and vertical screen switching.

The distance sensor 980F is configured to measure a distance. The electronic device 900 may measure a distance by infrared light or laser. In some embodiments, in a scenario of image acquisition during AR translation, the electronic device 900 may measure a distance by using the distance sensor 980F, to implement quick focusing.

The proximity light sensor 980G may include, for example, a light-emitting diode (light-emitting diode, LED) and an optical detector, for example, a photodiode. The light-emitting diode may be an infrared light-emitting diode. The electronic device 900 emits infrared light by using the light emitting diode. The electronic device 900 detects infrared reflected light from a nearby object by using the photodiode. In a case that sufficient reflected light is detected, it may be determined that there is an object near the electronic device 900. In a case that insufficient reflected light is detected, the electronic device 900 may determine that there is no object near the electronic device 900. The electronic device 900 may measure a distance between the electronic device 900 and the to-be-translated target by using the proximity light sensor 980G and a change in the distance.

The ambient light sensor 980K is configured to sense brightness of ambient light. The electronic device 900 may adaptively adjust the brightness of the display screen 994 based on the perceived ambient light brightness. The ambient light sensor 980K may be further configured to automatically adjust white balance during image acquisition.

The magnetic sensor 980D includes a Hall sensor. The electronic device 900 may detect a displacement of the electronic device 900 by using the magnetic sensor 980D. In some embodiments, the Hall sensor may form a linear trapezoidal magnetic field (or referred to as slope magnetic field) by using a magnet, a displacement change of a Hall plate in linear magnetic field is consistent with magnetic field strength change, a Hall potential formed is also proportional to the displacement, and the electronic device 900 obtains the Hall potential, so that the displacement of electronic device 900 can be measured.

The touch sensor 980J is also referred to as a "touch panel". The touch sensor 980J may be arranged on the display screen 994. The touch sensor 980J and the display screen 994 form a touchscreen, which is also referred to as a "touchscreen". The touch sensor 980J is configured to detect a touch operation performed on or near the touch sensor 980J. The touch sensor may transfer the detected touch operation to the application processor to determine a type of the touch event. A visual output related to the touch operation may be provided through the display screen 994. In some other embodiments, the touch sensor 980J may alternatively be arranged on a surface of the electronic device 900 at a position different from that of the display screen 994.

The key 990 includes a power-on key, a volume key, an AR translation control, and the like. The button 990 may be a mechanical button, or a touch-type button. The electronic device 900 may receive a key input and generate a key signal input related to a user setting and a function control of the electronic device 900. For example, in a case that the electronic device receives an input of a user on an AR translation control, the electronic device 900 may generate an instruction for triggering to start a camera and to enable an AR translation function.

The motor 991 may generate a vibration prompt. The motor 991 may be used for an incoming call vibration prompt and a touch vibration feedback. For example, touch operations applied to different applications (for example, AR translation applications) may correspond to different vibration feedback effects. For touch operations performed on different regions of the display screen 994, the motor 991 may also correspond to different vibration feedback effects. Different application scenarios may also correspond to different vibration feedback effects. Customization of a touch vibration feedback effect may also be supported.

Optionally, the electronic device 900 may be a mobile terminal or a non-mobile terminal. Exemplarily, the electronic device 900 may be a mobile phone, a tablet computer, a notebook computer, a palmtop computer, an in-vehicle terminal, a wearable device, an ultra-mobile personal computer (ultra-mobile personal computer, UMPC), a netbook or a personal digital assistant (personal digital assistant, PDA), a wireless headset, a wireless bracelet, wireless smart glasses, a wireless watch, augmented reality (augmented reality, AR)/virtual reality (virtual reality, VR) device, such as AR helmets or AR glasses. The device type of the electronic device 900 is not specifically limited in this embodiment of this application.

It should be understood that the electronic device 900 shown in FIG. 12 may correspond to the apparatus 800 shown in FIG. 11. The processor 910, the display screen 994, and the camera 993 in the electronic device 900 shown in FIG. 12 may correspond to the processing unit 820, the display unit 830, and the image acquisition unit 810 in the apparatus 800 in FIG. 11.

In actual implementation, the electronic device 900, when is run, causes the processor 910 to execute the computer executable instructions in the memory 921, to perform the operation steps of the foregoing method by the electronic device 900.

Optionally, in some embodiments, this application provides a chip, which is coupled to a memory, where the chip is configured to read and execute the computer program or instructions stored in the memory, to perform the method in the foregoing embodiments.

Optionally, in some embodiments, this application provides an electronic device, including a chip for reading and executing a computer program or instructions stored in a memory, to perform the method in the embodiments.

Optionally, in some embodiments, an embodiment of this application further provides a computer-readable storage medium, storing program code, where the computer program code, when run on a computer, causes the computer to perform the method according to the foregoing embodiments.

Optionally, in some embodiments, an embodiment of this application further provides a computer program product, including computer program code, where the computer program code, when run on a computer, causes the computer to perform the method according to the foregoing embodiments.

In this embodiment of this application, the electronic device includes a hardware layer, an operating system layer running on the hardware layer, and an application layer running on the operating system layer. The hardware layer may include hardware such as a central processing unit (central processing unit, CPU), a memory management unit (memory management unit, MMU), and a memory (which is also referred to as a main memory). The operating system in the operating system layer may be any one or more computer operating systems such as a Linux operating system, a Unix operating system, an Android operating system, an iOS operating system, or a Windows operating system that implement service processing by using a process (process). The application layer may include an application such as a browser, an address book, word processing software, or instant messaging software.

The embodiments of this application do not specifically limit a specific structure of an execution entity of the method provided in the embodiments of this application, as long as the program in which the code of the methods provided in the embodiments of this application are recorded can be executed to communicate according to method provided in the embodiments of this application. For example, the execution entity of the method provided in the embodiments of this application may be an electronic device, or may be functional modules in the electronic device that can invoke a program and execute the program.

Aspects or features of this application may be implemented as a method, an apparatus or a product that uses standard programming and/or engineering technologies. The term "product" used in this application may cover a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD), or a digital versatile disc (digital versatile disc, DVD)), a smart card, and a flash memory component (for example, an erasable programmable read-only memory (erasable programmable read-only memory, EPROM), a card, a stick, or a key drive).

Various storage media described in this specification may indicate one or more devices and/or other machine-readable media that is used to store information. The term "machine readable medium" may include, but is not limited to: a radio channel, and various other media that can store, include, and/or carry instructions and/or data.

It should be understood that, in this embodiment of this application, the mentioned processor may be a central processing unit (Central Processing Unit, CPU), or the processor may be another general purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM) or a flash memory. The volatile memory may be a random access memory (random access memory, RAM). For example, the RAM may be used as an external cache. By way of example, and not limitation, the RAM may include the following various forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that in a case that the processor is a general-purpose processor, a DSP, an ASIC, an FPGA, or another programmable logic device, a discrete gate or a transistor logic device, or a discrete hardware component, the memory (a storage module) may be integrated into the processor.

It should be further noted that the memory described herein aims to include but not limited to these memories and any other suitable types of memories.

A person of ordinary skill in the art may be aware that the units and steps in the examples described with reference to the embodiments disclosed in this specification may be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the protection scope of this application.

A person skilled in the art can clearly understand that for convenience and conciseness of description, for specific working processes of the foregoing systems, apparatuses, and units, reference may be made to the corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of this embodiment.

In addition, functional units in the embodiments of this application may be integrated into one processing unit, or each of the units may be physically separated, or two or more units may be integrated into one unit.

When the function is implemented in the form of a software functional unit and sold or used as an independent product, the function may be stored in a computer-readable storage medium. Based on such an understanding, the technical solutions of this application essentially, or the part contributing to the related art, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in the embodiments of this application. The foregoing storage medium may include, but is not limited to: a USB flash drive, a removable hard disk, or a medium such as a ROM, a RAM, a magnetic disk, or an optical disc that can store program code.

Unless otherwise defined, meanings of all technical and scientific terms used in this specification are the same as those usually understood by a person skilled in the art to which this application belongs. In this application, terms used in the specification of this application are merely intended to describe objectives of the specific embodiments, but are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be used as protection scope of the claims.

What is claimed is:

1. An augmented reality (AR) translation processing method, comprising:
   acquiring, by a camera of an electronic device, a first image, wherein the first image comprises first to-be-translated text;
   translating the first to-be-translated text, to obtain a first translation result;
   displaying the first image and displaying a first virtual image on the first image in a superimposed manner, wherein the first virtual image comprises the first translation result;
   acquiring, by the camera, a second image, wherein the second image comprises second to-be-translated text;

in a case that a pose change amount of the electronic device is less than a preset pose threshold and a feature similarity between the second image and the first image is greater than or equal to a preset similarity threshold, obtaining the first translation result as a translation result of the second to-be-translated text;

in a case that a pose change amount of the electronic device is less than a preset pose threshold and a feature similarity is less than a preset similarity threshold, translating the second to-be-translated text;

in a case that a pose change amount of the electronic device is greater than or equal to a preset pose threshold and a feature similarity is less than a preset similarity threshold, translating part or all of text in the second to-be-translated text; and displaying the second image and displaying a second virtual image on the second image in a superimposed manner, wherein the second virtual image comprises the translation result of the second to-be-translated text.

2. The method according to claim 1, the translating part or all of text in the second to-be-translated text comprises:

in a case that a first part of text in the second to-be-translated text is the same as the first to-be-translated text, obtaining the first translation result as a translation result of the first part of text; and translating a second part of text, to obtain a translation result of the second part of text, wherein the second part of text is text other than the first part of text in the second to-be-translated text; and the translation result of the second to-be-translated text comprises the translation result of the first part of text and the translation result of the second part of text.

3. The method according to claim 1, the translating part or all of text in the second to-be-translated text comprises:

in a case that the second to-be-translated text and the first to-be-translated text do not have same text, translating all of text in the second to-be-translated text, to obtain the translation result of the second to-be-translated text.

4. The method according to claim 1, further comprising:

extracting feature points in the first image and feature points in the second image; and comparing the feature points in the second image with the feature points in the first image, to obtain the feature similarity between the second image and the first image.

5. The method according to claim 1, further comprising:

generating an SLAM map by using a simultaneous localization and mapping SLAM method; and based on the second image, measurement data of a target sensor in the electronic device, and the SLAM map, determining a pose change amount of the electronic device, wherein the pose change amount comprises a position change amount and a posture change amount; and the target sensor comprises an inertial measurement unit IMU.

6. The method according to claim 1, further comprising:

determining, by using an SLAM method, a target virtual plane for displaying AR digital content, wherein the target virtual plane is located above a plane where the acquired image is located; and the displaying a second virtual image on the second image in a superimposed manner comprises:

displaying the second virtual image on the target virtual plane.

7. The method according to claim 6, further comprising:

determining a target projection region of the second to-be-translated text on the target virtual plane, wherein the displaying the second virtual image on the target virtual plane comprises:

displaying the second virtual image in the target projection region.

8. The method according to claim 7, the determining a target projection region of the second to-be-translated text on the target virtual plane comprises:

determining a first rectangular region occupied by the second to-be-translated text in the second image;

based on two endpoints on a diagonal of the first rectangular region, determining two anchor points of the two endpoints mapped on the target virtual plane; and determining a second rectangular region on the target virtual plane with a connecting line of the two anchor points as a diagonal, wherein the second rectangular region is a target projection region of the second to-be-translated text on the target virtual plane, and a transparency of the target projection region is less than or equal to a preset transparency threshold.

9. The method according to claim 1, further comprising:

performing text recognition on the first image, to obtain the first to-be-translated text;

performing text recognition on the second image, to obtain the second to-be-translated text;

rendering the translation result of the first to-be-translated text, to obtain the first virtual image; and rendering the translation result of the second to-be-translated text, to obtain the second virtual image.

10. An electronic device, comprising a display screen, a camera, and a processor, wherein the processor is coupled to a memory and configured to execute a computer program or instructions stored in the memory, to cause the electronic device to implement the following steps:

acquiring, by a camera of the electronic device, a first image, wherein the first image comprises first to-be-translated text;

translating the first to-be-translated text, to obtain a first translation result;

displaying the first image and displaying a first virtual image on the first image in a superimposed manner, wherein the first virtual image comprises the first translation result;

acquiring, by the camera, a second image, wherein the second image comprises second to-be-translated text;

in a case that a pose change amount of the electronic device is less than a preset pose threshold and a feature similarity between the second image and the first image is greater than or equal to a preset similarity threshold, obtaining the first translation result as a translation result of the second to-be-translated text;

in a case that a pose change amount of the electronic device is less than a preset pose threshold and a feature similarity is less than a preset similarity threshold, translating the second to-be-translated text;

in a case that a pose change amount of the electronic device is greater than or equal to a preset pose threshold and a feature similarity is less than a preset similarity threshold, translating part or all of text in the second to-be-translated text; and displaying the second image and displaying a second virtual image on the second image in a superimposed manner, wherein the second virtual image comprises the translation result of the second to-be-translated text.

11. The electronic device according to claim 10, the translating part or all of text in the second to-be-translated text comprises:
- in a case that a first part of text in the second to-be-translated text is the same as the first to-be-translated text, obtaining the first translation result as a translation result of the first part of text; and
- translating a second part of text, to obtain a translation result of the second part of text, wherein the second part of text is text other than the first part of text in the second to-be-translated text; and
- the translation result of the second to-be-translated text comprises the translation result of the first part of text and the translation result of the second part of text.

12. The electronic device according to claim 10, the translating part or all of text in the second to-be-translated text comprises:
- in a case that the second to-be-translated text and the first to-be-translated text do not have same text, translating all of text in the second to-be-translated text, to obtain the translation result of the second to-be-translated text.

13. The electronic device according to claim 10, wherein when the computer program or instructions are executed by the processor, the electronic device is enabled to further perform the following steps:
- extracting feature points in the first image and feature points in the second image; and
- comparing the feature points in the second image with the feature points in the first image, to obtain the feature similarity between the second image and the first image.

14. The electronic device according to claim 10, wherein when the computer program or instructions are executed by the processor, the electronic device is enabled to further perform the following steps:
- generating an SLAM map by using a simultaneous localization and mapping SLAM method; and
- based on the second image, measurement data of a target sensor in the electronic device, and the SLAM map, determining a pose change amount of the electronic device, wherein
- the target sensor comprises an inertial measurement unit IMU.

15. The electronic device according to claim 10, the pose change amount comprises a position change amount and a posture change amount.

16. The electronic device according to claim 10, wherein when the computer program or instructions are executed by the processor, the electronic device is enabled to further perform the following steps:
- determining, by using an SLAM method, a target virtual plane for displaying AR digital content, wherein the target virtual plane is located above a plane where the acquired image is located; and
- the displaying a second virtual image on the second image in a superimposed manner comprises:
- displaying the second virtual image on the target virtual plane.

17. The electronic device according to claim 16, wherein when the computer program or instructions are executed by the processor, the electronic device is enabled to further perform the following steps:
- determining a target projection region of the second to-be-translated text on the target virtual plane, wherein the displaying the second virtual image on the target virtual plane comprises:
- displaying the second virtual image in the target projection region.

18. The electronic device according to claim 17, the determining a target projection region of the second to-be-translated text on the target virtual plane comprises:
- determining a first rectangular region occupied by the second to-be-translated text in the second image;
- based on two endpoints on a diagonal of the first rectangular region, determining two anchor points of the two endpoints mapped on the target virtual plane; and
- determining a second rectangular region on the target virtual plane with a connecting line of the two anchor points as a diagonal, wherein
- the second rectangular region is a target projection region of the second to-be-translated text on the target virtual plane, and a transparency of the target projection region is less than or equal to a preset transparency threshold.

19. The electronic device according to claim 10, wherein when the computer program or instructions are executed by the processor, the electronic device is enabled to further perform the following steps:
- performing text recognition on the first image, to obtain the first to-be-translated text;
- performing text recognition on the second image, to obtain the second to-be-translated text;
- rendering the translation result of the first to-be-translated text, to obtain the first virtual image; and
- rendering the translation result of the second to-be-translated text, to obtain the second virtual image.

20. A computer-readable storage medium, storing a computer program, wherein the computer program, when executed on an electronic device, causes the electronic device to perform the following steps:
- acquiring, by a camera of the electronic device, a first image, wherein the first image comprises first to-be-translated text;
- translating the first to-be-translated text, to obtain a first translation result;
- displaying the first image and displaying a first virtual image on the first image in a superimposed manner, wherein the first virtual image comprises the first translation result;
- acquiring, by the camera, a second image, wherein the second image comprises second to-be-translated text;
- in a case that a pose change amount of the electronic device is less than a preset pose threshold and a feature similarity between the second image and the first image is greater than or equal to a preset similarity threshold, obtaining the first translation result as a translation result of the second to-be-translated text;
- in a case that a pose change amount of the electronic device is less than a preset pose threshold and a feature similarity is less than a preset similarity threshold, translating the second to-be-translated text;
- in a case that a pose change amount of the electronic device is greater than or equal to a preset pose threshold and a feature similarity is less than a preset similarity threshold, translating part or all of text in the second to-be-translated text; and
- displaying the second image and displaying a second virtual image on the second image in a superimposed manner, wherein the second virtual image comprises the translation result of the second to-be-translated text.

\* \* \* \* \*